(12) United States Patent
Hird et al.

(10) Patent No.: US 11,822,039 B2
(45) Date of Patent: Nov. 21, 2023

(54) FORMATION EVALUATION AT DRILL BIT

(71) Applicant: Schlumberger Technology Corporation, Sugar Land, TX (US)

(72) Inventors: Jonathan Robert Hird, Cambridge (GB); Ashley Bernard Johnson, Milton (GB); John Mervyn Cook, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 60 days.

(21) Appl. No.: 17/769,931

(22) PCT Filed: Oct. 8, 2020

(86) PCT No.: PCT/US2020/054685
§ 371 (c)(1),
(2) Date: Apr. 18, 2022

(87) PCT Pub. No.: WO2021/080778
PCT Pub. Date: Apr. 29, 2021

(65) Prior Publication Data
US 2022/0381938 A1 Dec. 1, 2022

Related U.S. Application Data

(60) Provisional application No. 62/923,666, filed on Oct. 21, 2019.

(51) Int. Cl.
*E21B 10/567* (2006.01)
*E21B 49/00* (2006.01)
(Continued)

(52) U.S. Cl.
CPC ............... *G01V 3/30* (2013.01); *E21B 10/26* (2013.01); *E21B 10/42* (2013.01); *E21B 10/567* (2013.01);
(Continued)

(58) Field of Classification Search
CPC ...................................... E21B 10/567
See application file for complete search history.

(56) References Cited

U.S. PATENT DOCUMENTS

| 5,517,024 A | 5/1996 | Mullins et al. |
| 5,663,559 A | 9/1997 | Auzerais et al. |

(Continued)

FOREIGN PATENT DOCUMENTS

| WO | 2006065559 A1 | 6/2006 |
| WO | 2014035421 A1 | 3/2014 |
| WO | 2015188922 A2 | 12/2015 |

OTHER PUBLICATIONS

International Search Report and Written Opinion in International Patent Application No. PCT/US2020/054685, dated Jan. 27, 2021, 13 pages.

(Continued)

*Primary Examiner* — Giovanna Wright
(74) *Attorney, Agent, or Firm* — Jeffrey D. Frantz

(57) ABSTRACT

In a drill bit which has hard-faced cutting or gauge protection elements positioned to be in direct contact with subterranean formation as the bit is rotated, at least one of these elements includes a window positioned to be in direct contact with the formation or cuttings from the formation as the bit rotates and moves forward to drill into the formation. Electromagnetic radiation with wavelength in the range from 100 nm to 2600 nm is transmitted through the window to the formation in contact with the window. Electromagnetic radiation such as fluorescence that returns through the (Continued)

same window is received by a spectrometer. The source and receiver of electromagnetic radiation are both accommodated within the downhole drilling equipment but spaced from the windowed element. The electromagnetic radiation travels along light guides from the source to the window and from the window to the receiver.

21 Claims, 12 Drawing Sheets

(51) Int. Cl.
| | |
|---|---|
| G01V 3/30 | (2006.01) |
| E21B 47/013 | (2012.01) |
| E21B 47/017 | (2012.01) |
| E21B 10/26 | (2006.01) |
| E21B 10/42 | (2006.01) |
| E21B 47/135 | (2012.01) |
| E21B 47/13 | (2012.01) |

(52) U.S. Cl.
CPC ........ *E21B 47/013* (2020.05); *E21B 47/0175* (2020.05); *E21B 47/13* (2020.05); *E21B 47/135* (2020.05); *E21B 49/00* (2013.01); *E21B 49/005* (2013.01)

(56) References Cited

U.S. PATENT DOCUMENTS

| | | | |
|---|---|---|---|
| 5,912,459 | A | 6/1999 | Mullins et al. |
| 6,140,637 | A | 10/2000 | Mullins et al. |
| 6,769,487 | B2 | 8/2004 | Hache |
| 7,646,480 | B2 | 1/2010 | Vessereau et al. |
| 8,087,477 | B2 | 1/2012 | Sullivan et al. |
| 8,853,879 | B2 | 10/2014 | Rytlewski et al. |
| 9,932,817 | B1 | 4/2018 | Kusmer et al. |
| 9,995,088 | B2 | 6/2018 | Difoggio |
| 2002/0118905 | A1* | 8/2002 | Wu .................... G01N 21/64 385/12 |
| 2006/0102343 | A1* | 5/2006 | Skinner ................ E21B 7/15 166/57 |
| 2006/0191682 | A1 | 8/2006 | Storm et al. |
| 2009/0032259 | A1* | 2/2009 | DiFoggio ............ E21B 47/017 166/57 |
| 2010/0089645 | A1 | 4/2010 | Trinh et al. |
| 2011/0253448 | A1 | 10/2011 | Trinh et al. |
| 2011/0266058 | A1 | 11/2011 | Kumar et al. |
| 2012/0132468 | A1 | 5/2012 | Scott et al. |
| 2012/0325564 | A1 | 12/2012 | Vaughn et al. |
| 2013/0083536 | A1 | 4/2013 | Hall et al. |
| 2013/0270007 | A1 | 10/2013 | Scott et al. |
| 2014/0224539 | A1 | 8/2014 | Kumar et al. |
| 2014/0326506 | A1 | 11/2014 | Difoggio |
| 2015/0085101 | A1 | 3/2015 | Tjhang et al. |
| 2015/0218900 | A1 | 8/2015 | Hallundbæk et al. |
| 2015/0240617 | A1 | 8/2015 | Pelletier et al. |
| 2015/0322720 | A1 | 11/2015 | Pelletier et al. |
| 2016/0319660 | A1 | 11/2016 | Digiovanni et al. |
| 2017/0183915 | A1 | 6/2017 | Scott et al. |
| 2017/0292376 | A1 | 10/2017 | Kumar et al. |
| 2017/0299828 | A1* | 10/2017 | Bhongale ............ E21B 47/135 |
| 2018/0258707 | A1 | 9/2018 | Difoggio |
| 2018/0320513 | A1 | 11/2018 | Scott et al. |
| 2019/0055789 | A1 | 2/2019 | Azar et al. |

OTHER PUBLICATIONS

Verma et al., "Thermal Management of Electronics Used in Downhole Tools", SPE 159737, Society of Petroleum Engineers Technical Conference, San Antonio, Texas, US, Oct. 2012, 10 pages.
Ahmad et al., "Piezoelectric Based Flow Power Harvesting for Downhole Environment", SPE 176777, SPE Middle East Intelligent Oil and Gas Conference and Exhibition, Abu Dhabi, UAE, Sep. 2015, 8 pages.
Sci-Aps, Libs: Handheld Laser Induced Breakdown Spectroscopy, https://www.sciaps.com/libs-handheld-laser-analyzers/, [site accessed Dec. 21, 2018].
Sasazawa et al, "Optical-fiber-based laser-induced breakdown spectroscopy for detection of early caries", National Library of Medicine, PubMed.gov, Jun. 2015, available at https://www.ncbi.nlm.nih.gov/pubmed/26039382, 10 pages.
Seki et al., "Hollow-optical-fiber-based laser-induced breakdown spectroscopy system and its use in soil salinity measurements", Applied Physics Express, 6(10), 102402, 2013, available at http://iopscience.iop.org/article/10.7567/APEX.6.102402, 4 pages.
Attenuated total reflectance, Wikipedia, https://en.wikipedia.org/wiki/Attenuated_total_reflectance (site accessed Dec. 21, 2018).
Utzinger et al., "Fiber optic probes for biomedical optical spectroscopy", Journal of Biomedical Optics 8(1), 121-147, Jan. 2003, 27 pages.
Ryder, A.G., "Analysis of crude petroleum oils using fluorescence spectroscopy"; Reviews in Fluorescence, 2005, pp. 169-198.
Gillespie et al., "Fluorescence microspectroscopy as a tool to determine the thermal maturation and API gravity of naturally occurring crude oils or oil-bearing fluid inclusions within Newfoundland and Labrador." Report for Department of Natural Resources, Geological Survey of Canada, 2012, 42 pages.
Matsuura et al., "Infrared laser delivery system based on polymer coated hollow fibers"; Optics and Laser Technology, vol. 33 (2001), pp. 279-283.
Iwai et al., "Fabrication of Shatter-Proof Metal Hollow-Core Optical Fibers for Endoscopic Mid-Infrared Laser Applications", Fibers, vol. 6(2), 24, 2018, 8 pages.
Element Six, "Using Meta-surfaces Etched into Diamond Eliminates the Need for Thin Film Coatings, Enabling More Than 10 Times Increase in Damage Thresholds for Applications Including EUV Lithography", accessed from https://www.e6.com/en/about/news/element-six-introduces-diamond-pureoptics-the-firs; Element Six Ltd of Ascot, Berkshire, UK and Santa Clara, California, USA, 2015.
Hamamatsu, "Fingertip size, ultra-compact spectrometer head integrating MEMS and image sensor technologies", downloaded from: https://www.hamamatsu.com/us/en/product/optical-sensors/spectrometers/mini-spectrometer/C12666MA.html, Hamamatsu Corporation, Bridgewater, New Jersey, USA and Hamamatsu Photonics UK Limited, Welwyn Garden City, Hertfordshire, UK, 2019.
Thorlabs, "Polyimide-Coated Single Mode Fiber", Thorlabs Inc, Newton, New Jersey, USA and Thorlabs Ltd, Ely, UK, 2019.
"Commercial Building Telecommunications Cabling Standard", ANSI/TIA 568-B, 2006, 62 pages.

* cited by examiner

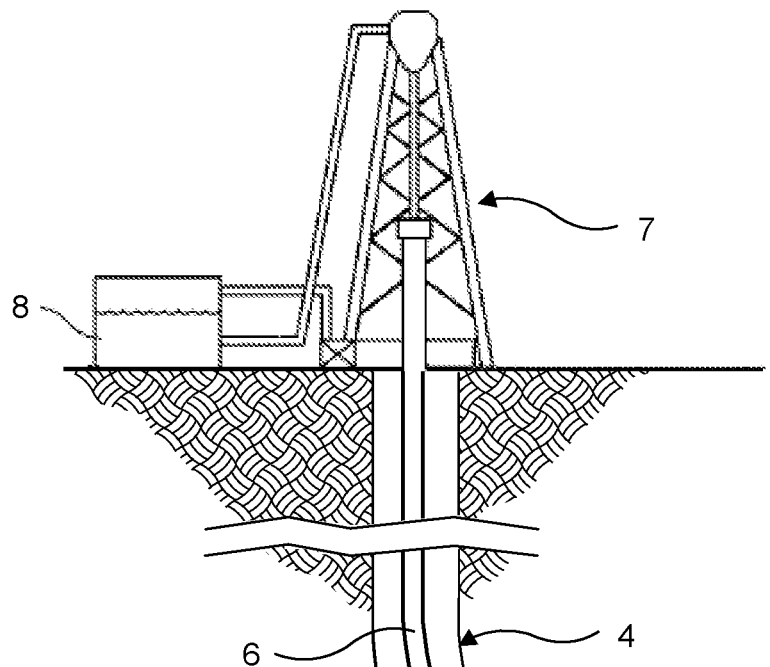
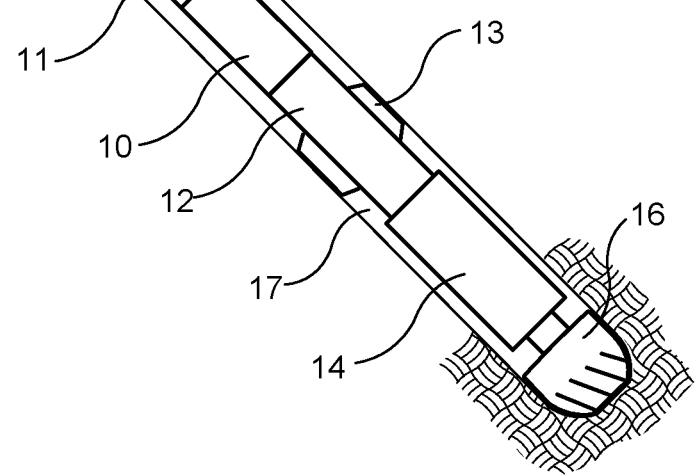
Fig. 1
(prior art)

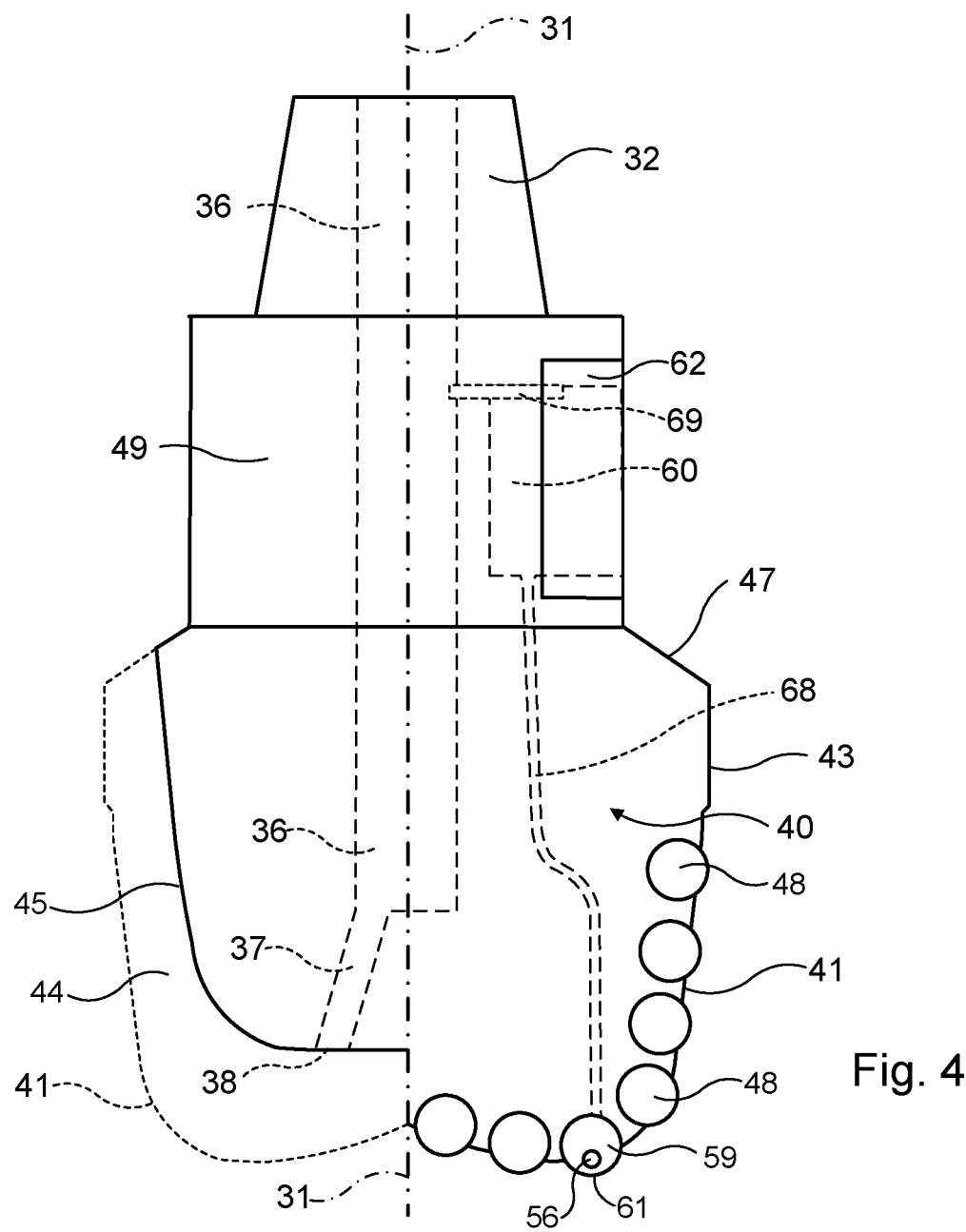
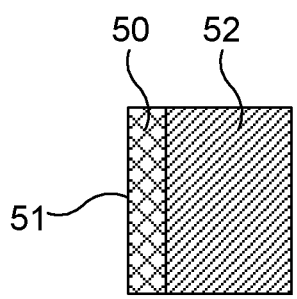
Fig. 5
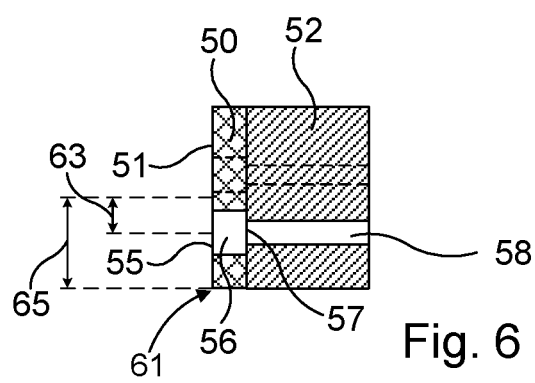
Fig. 6

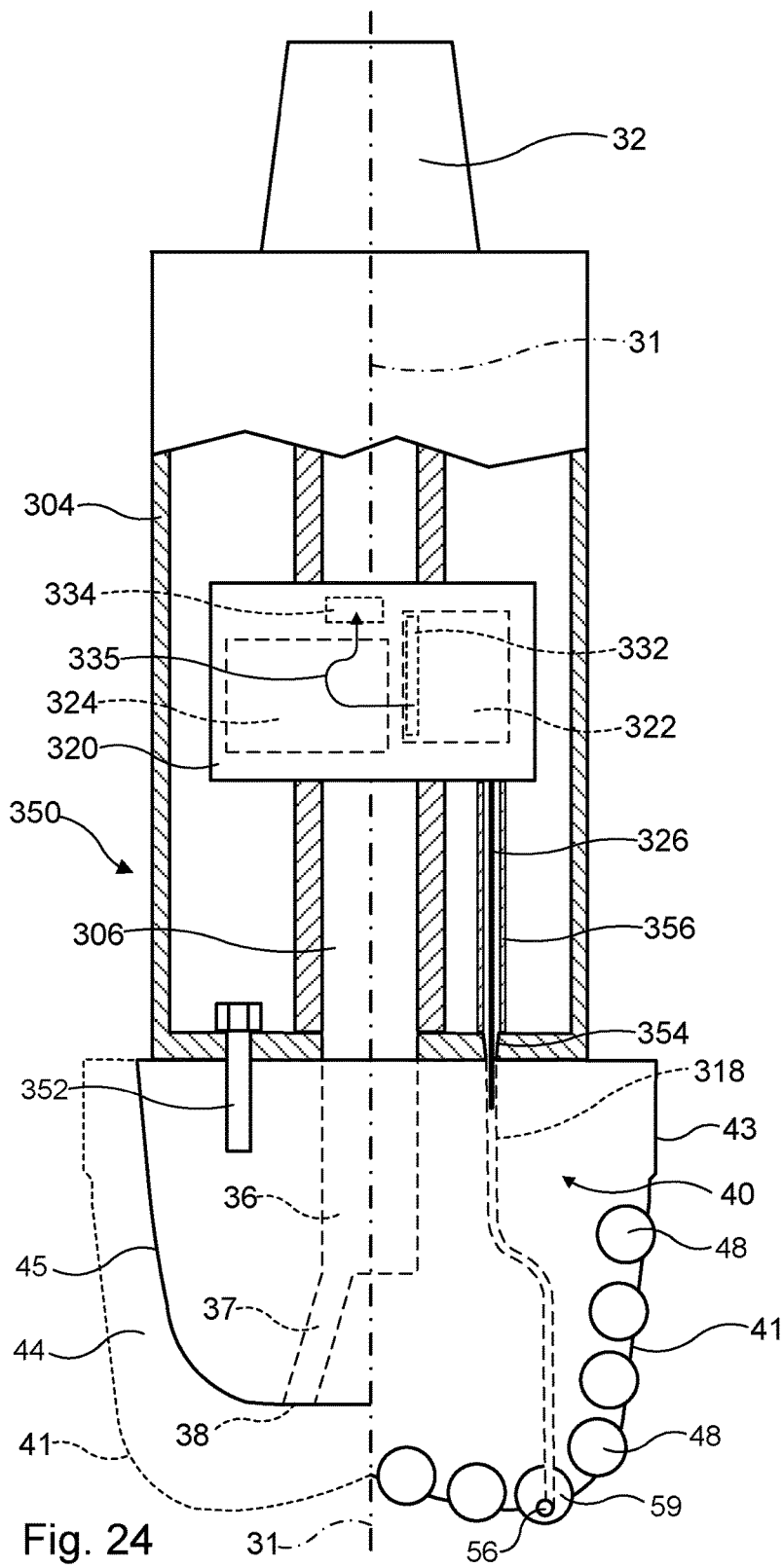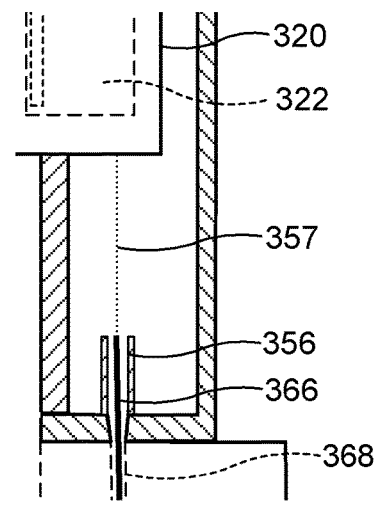
Fig. 24
Fig. 25

FORMATION EVALUATION AT DRILL BIT

CROSS-REFERENCE TO RELATED APPLICATIONS

This application claims the benefit of, and priority to, U.S. Patent Application No. 62/923,666, filed on 21 Oct. 2019 and titled "Formation Evaluation at Drill Bit", which application is expressly incorporated herein by this reference in its entirety.

BACKGROUND

In drilling a wellbore for the production of oil and gas, an underground borehole is drilled using a rotary drill bit at the end of a drill string extending from the surface. Drilling fluid (or so-called mud) which contains suspended solids is pumped down the drill string, out nozzles in the drill bit, and back up the annulus around the drill string to the surface. This circulating mud cools the drill bit and carries the cuttings to the surface.

Information can be gathered as the drilling operation takes place. For instance, mud can be examined as it returns to the surface, by using a variety of techniques to reveal mineralogy or the presence of hydrocarbons. Particularly for deep wells, however, there can be a significant amount of time delay as the mud travels length of the borehole. There may also be uncertainty as to whether something observed in the mud, notably hydrocarbons when the borehole penetrates an oil-bearing formation, has entered the mud at the extremity of the borehole or elsewhere along the length of the borehole.

Information can also be collected downhole while drilling. For instance, the drill string can include a bottomhole assembly at the end of the drill string, with the drill bit itself at the leading end of the bottomhole assembly (and an optional reamer next to the drill bit or farther uphole). Equipment included in the bottomhole assembly may include logging while drilling (LWD) and measuring while drilling (MWD) tools collecting information in the vicinity of the drill bit. Some of these tools operate by drawing a sample of fluid into the tool and subjecting it to analysis.

There have been some proposals to use a tool in the bottomhole assembly to examine fluid while it is still outside the bottomhole assembly, or to examine the borehole wall. U.S. Pat. Nos. 5,912,459 and 6,140,637 are incorporated herein by this reference and describe wireline and LWD tools for locating hydrocarbons in a wellbore by directing visible or near ultraviolet light onto the borehole wall through a wear resistant window and observing whether there is fluorescence from the borehole wall. A drill bit is also mentioned as possibly including a window, without any further details. International Patent Publication No. WO2015/188922 is incorporated herein by this reference and describes an LWD tool having a window through which light is directed at the borehole wall, and use of the tool to observe whether there is fluorescence. A drill bit is again briefly mentioned as potentially including a window, but without any details.

Few documents have given more detail of placing a window in the drill bit itself. Fixed cutter drill bits can be constructed with a body having blades that define a plurality of pockets into which cutters with superhard cutting faces are fitted. The cutters are frequently polycrystalline diamond (PDC) cutters that have a substrate attached to a diamond table. The diamond table is formed of diamond particles sintered with a binder (although some of the binder can subsequently be removed through leaching), and which can form an outer layer or disc that includes the cutting face. These cutters may be secured in place by brazing the substrate to the bit blade.

U.S. Patent Publication No. 2013/0083536 is incorporated herein by this reference and describes a drill bit in which an element includes a transparent, very hard window surface in the superhard cutter material. This window may be formed of diamond, and the element may be a cutter that shears the formation or an indenter which crushes the formation. The window may be used to deliver a laser beam of sufficient power to assist in cutting the formation or may be used to deliver light to the formation and allow reflected light to return to a sensor. This reflected light may reveal properties of the formation, such as color and density. In the embodiments which are shown, the light source and light receiver are positioned inside the drill bit, adjacent the windowed element. The possibility of optical communication with the window through optical fiber is mentioned briefly, but without detail.

U.S. Pat. No. 9,995,088 is incorporated herein by this reference and describes a drill bit in which one of the cutters includes a transparent window through its superhard cutting face. This window may be made of diamond, and a light source is used to send light through the window to the formation being cut by the cutter. A receiver for infra-red or Raman spectroscopy receives light returning through the window and is located within the cutter body directly adjacent the window.

International Patent Publication No. WO2014/035421 is incorporated herein by this reference and describes a drill bit in which cutters or depth controllers have a superhard outer surface and may include a transparent diamond window. An opto-analytical device is located in a cavity within the drill bit and receives light entering through the window and travelling along a pathway within the drill bit leading to the opto-analytical device. The cavity within the drill bit may also contain a light source sending light along a second pathway to another window. It is briefly mentioned that the pathways may contain optical fibers or light pipes. The system may be used to monitor drilling performance and may be used to observe cuttings travelling past a window.

SUMMARY

Embodiments of the present disclosure are concerned with formation evaluation by spectroscopy utilizing a window through a cutter, or another element with a very hard surface, fitted to a drill bit at a location such that the window can be in contact with formation rock before drilling fluid has penetrated the rock pores or has deposited solids on it. However, utilizing a window which is in contact with formation rock as it is cut is challenging. The very hard surfaces of cutters which a drill bit brings into contact with the formation rock are small and are on parts of a drill bit which are configured solely for cutting into formation rock. Heat is generated at the cutting surfaces of the drill bit and can make the cutters hotter than other parts of the drill bit and the bottomhole assembly.

In this disclosure the term "light" is used to denote visible light and also electromagnetic radiation with wavelengths adjoining the visible spectrum, that is to say ultraviolet light and near infrared. The wavelength range may be from 100 nm possibly from 200 nm up to 2600 nm, or in some embodiments up to 2000 nm, up to 1600 nm, or up to 900 nm. The wavelength range is of course linked to the form of spectroscopy carried out.

The present disclosure contains many features which are novel, novel in the present context, or novel in combination. All features disclosed herein may be used in any combination in so far as they are compatible.

A first aspect of this disclosure provides drilling equipment which is a drill bit or a bottomhole assembly including a drill bit (which includes an underreamer), where the drill bit includes a body defining a plurality of pockets which accommodate inserted elements with superhard exterior faces positioned to contact subterranean formation as the bit is rotated. At least one of the elements can include a window which is transparent or near transparent to electromagnetic radiation (i.e. light as that term is used herein). The window may have an interior surface and a hard exterior surface, with the hard exterior surface positioned to contact the formation or cuttings as the bit is rotated and urged forward to drill into the formation. The equipment can include a source of electromagnetic radiation with wavelength within a range from 100 nm to 2600 nm positioned and configured to transmit electromagnetic radiation through the window towards the formation. The equipment may also include a receiver within the drilling equipment positioned and configured to receive and analyze electromagnetic radiation returning through the same window. The source and receiver can both be accommodated within the drilling equipment and spaced from the windowed element. A cutter or other element with a superhard outer surface and which is intended to be in direct contact with the formation as the drill bit is operated can contact and optionally degrade the formation or other workpiece which is currently being cut or has just been cut.

At least one of the source or the receiver may be optically coupled to the window by one or more light guides forming at least part of an optical path running through the drill bit body and the windowed element to the interior surface of the window.

The source may be an assembly including a device which generates light and also having optical elements which reflect or refract light from the source. The receiver may be an assembly including a spectrometer or other device for analyzing and measuring light and also having optical elements which reflect or refract light going towards the receiver.

Because the window is positioned to be in contact with the formation, it is not expected that the transmitted light will be able to penetrate more than a very small distance beyond the window. Accordingly, as the present disclosure requires, the light which returns from the formation to the receiver passes through the same window as the transmitted light.

An inserted element with a very hard exterior surface positioned to contact the formation may be a cutter intended to cut into the formation by shearing. An advantage of the present disclosure is that it becomes possible for the windowed element to be a cutter located in a blade which projects from the body of a drill bit. However, a windowed element could be a central indenter as was envisaged in U.S. Patent Publication No. 2013/0083536 or it could be an element positioned to scrape across the newly cut formation surface. A very hard surface may be provided by a material which meets the criterion of a Vickers hardness of 40 GPa or more. This is the criterion for a material to be termed superhard. The window in a windowed element may be diamond, which has a hardness above 40 GPa, and more specifically it may be a light transmitting monocrystalline diamond set into a larger body of polycrystalline diamond. For instance, it may be a disc of monocrystalline diamond set into a larger disc of polycrystalline diamond, with the exposed face of the monocrystalline diamond coplanar with the exposed face of the polycrystalline diamond disc. Another possibility is a monocrystalline diamond on the axis of a conical body of polycrystalline diamond.

It will be appreciated that a cutter in a blade of a bit will usually face and travel in a generally circumferential direction relative to the rotational axis of the drill bit. Light transmitted through a window in such a cutter may be expected to be transmitted in a direction which is tangential to the circumferential advance of the cutter, or at least has a predominant component in such a direction. An element with a superhard cutting or gauge protection face may be positioned to scrape across the newly cut formation surface may face in a generally axial direction relative to the rotational axis of the drill bit, so that light transmitted through a window in such an element may have a predominant component in a generally axial direction.

The window has a very hard exterior surface in order to resist wear in contact with the formation. The hardness of the interior surface which faces into the drill bit is not so significant. But when the window is formed of a single material such as diamond, it will have the same hardness on both faces.

When the drill bit rotates, contact between the cutters and the formation generates heat. Placing the light source and/or the receiver at locations spaced from the windowed element assists in protecting these items from temperatures which they cannot withstand.

The light source, the receiver or both of them may be located in one or more cavities which are in the body of the drill bit, which follows axially behind the cutters and is at some distance from the cutters. For instance a cavity housing a source or receiver is in a portion of a drill bit which follows axially behind the drill bit's cutters and any gauge pad which slides on the borehole wall. Such a region of the drill bit may extend out from the axis of the drill bit for a distance which is less than the full gauge of the bit, so that this region of the drill bit is spaced inwardly from the borehole wall. Such a portion of the drill bit may contain an entry point for access to a cavity in the drill bit. Such an entry point may face generally radially outwards.

More specifically, a drill bit may include a body with a plurality of blades projecting from the body and which extend radially to the gauge of the drill bit, followed axially by a portion of the drill bit which extends radially outwards to less than the full gauge of the drill bit. At least one of the source or the receiver may be accommodated within one or more cavities located within that portion of the drill bit which is at less than full gauge. Yet another possibility is that a drill bit is formed with gauge pads following behind blades with cutters, and a cavity or cavities for source and/or receiver is provided at a position within the drill bit body radially inwardly from these gauge pads.

The distance through the body of a drill bit from a cavity accommodating the source and/or receiver to the hard surfaced element with a window may be at least 10 cm. Another possibility is that the light source or the light receiver, or both of them may be located in a part of the BHA which follows behind the drill bit, in which case the distance from a cavity accommodating the source and/or receiver to the hard surfaced element with a window may be considerably more than 10 cm or 20 cm.

A light guide may be flexible. It may be a conduit within which light is transmitted by total internal reflection at the wall(s) or other boundary of the conduit. It may be a light pipe, which is a hollow tube with a reflective interior surface, or it may be an optical fiber with solid core through which light is transmitted, with this core surrounded by a cladding, where the refractive index of the core is lower than the refractive index of the cladding so that total internal reflection occurs at the interface between the core and the cladding. An optical fiber may be a bundle of optical fibers held within an outer sheath. Another possibility is that an optical fiber may have a plurality of cores embedded within a single strand of cladding material so that the exterior surface of each core is in direct contact with the surrounding cladding material.

One possibility for a flexible light pipe is a construction which has been termed a hollow optical fiber and described by Matsuura et al in "Infrared laser delivery system based on polymer coated hollow fibers" Optics and Laser Technology, Vol. 33, 2001, pp. 279-283, which is incorporated herein by this reference. This fiber was a narrow tube coated internally with a metallic reflective layer, with a polymer film as a dielectric layer on the interior surface of the metallic reflective layer. More recently, Iwai et al in Fibers 2018 vol. 6 have described a hollow optical fiber formed from a stainless steel tube.

A light guide may provide the whole or part, such as at least 75% of the length, of an optical path through the drilling equipment between the window and the source, the receiver or both the source and the receiver. Although a light guide may provide the whole of such an optical path, it is also possible that an optical path will include one or more sections in which light travels as a light beam which is not enclosed within a light guide.

One possibility is that a light guide provides the whole of an optical path for returning light between the window and the receiver while excitation light from the light source travels as a light beam which is not enclosed within a light guide for at least part of an optical path to the window from the source.

Light guides may be inserted along passageways running through a drill bit's body and through a cutter (or other element) to the inside face of a window after that windowed element has been secured in place in a pocket of the drill bit body. To enable this to be done a light guide may have some flexibility but also some stiffness. One possible criterion for flexibility is that the light guide can be bent but is resilient so that it will unbend when released. A possible criterion for stiffness is that a defined length of the fiber, such as 10 cm, held so as to project horizontally from a clamp, does not bend downwardly from the horizontal under its own weight by more than a specified amount, for instance such that the tip of the projecting portion is no more than 5 cm below a horizontal line from the clamp. A light guide may have a diameter or cross-sectional width of at least 0.5 mm, possibly at least 1 mm to facilitate handling and insertion through a passageway within a drill bit. The diameter or cross-sectional width may be not more than 3 mm, possibly not more than 2 mm. When a light guide is a bundle of smaller light guides, the bundle may have a cross-sectional width as above, such as from 1 mm or 0.5 mm up to 3 mm, or possibly up to 2 mm.

An internal passageway between a cavity in the drill bit and a windowed cutter may be dimensioned so that a light guide is a loose fit within it, and the passageway is shaped to allow a light guide or some other flexible item, to be pushed along the passageway without requiring or even without allowing the light guide to bend more tightly than is acceptable. A possible numerical criterion for a loose fit is that an internal passageway within a drill bit body has a section in which any transverse width across the passageway is no more than five times any transverse width across the light guide.

In order to facilitate insertion of a light guide along a passageway, any change in direction of the passageway may be a smooth curve. Alternatively, at a change in direction, two sections of the passageway may meet at an oblique angle of at least 120° possibly at least 135°. In either case the geometry of the passageway (both its cross section and amount of turn) may be such that the optical fibre is not forced to bend to a radius smaller than ten times its diameter or cross-sectional width.

At its end which contacts the interior face of the window a light guide may have a termination which incorporates a lens to refract light leaving and entering the light guide.

A light guide may be put in place with its end, or a termination at its end, pressing against the interior face of the window so as to maintain contact between the light guide and the window. The other end of the light guide may then be pressing against a fixed component part within the cavity in the drill bit where the light source or light receiver is accommodated.

The source and the receiver may contain both optical and electronic components, Optical components such as lenses and filters may be made from materials able to withstand temperatures encountered while drilling an underground borehole. Electronic components may be protected by providing cooling of a cavity or of components therein. Such cooling may utilise a thermally conductive path, such as a thermally conductive material or a heat pipe to carry heat away to the flow of drilling fluid. This may be the flow returning towards the surface around the outside of the bottomhole assembly, or may be the incoming flow which travels down the drill string and the bottomhole assembly to exit through nozzles in the drill bit. The cooling may involve active cooling, which may use one or more Peltier coolers in a cavity or in direct thermal contact with a component in a cavity. Active cooling may also be brought about using another form of cooling equipment, such as a refrigerating circuit in which a refrigerant undergoes changes of phase.

Formation evaluation using a windowed cutter may be carried out by one of various forms of spectroscopy in which transmitted light causes excitation and the returning light is emitted at one or more different wavelengths as the excitation decays. One such is fluorescence spectroscopy, using a light source to transmit excitation light able to stimulate fluorescence when the formation contains a fluorescent material, notably oil. In such a case the materials of the one or more light guides may be chosen so that they do not emit fluorescence within the light guides.

A second aspect of this disclosure provides drilling equipment which is a drill bit or a bottomhole assembly including a drill bit, where the drill bit includes a body defining a plurality of cavities which accommodate inserted elements with very hard exterior faces positioned to contact the formation as the bit is rotated, wherein at least one of the elements includes a window which is transparent to electromagnetic radiation, the window having an interior surface and a very hard exterior surface positioned to contact the formation as the bit is rotated, the equipment including a source of electromagnetic radiation configured to transmit electromagnetic radiation with wavelength in a first range which is between 100 nm and 500 nm through the window towards the formation and a receiver within the drilling tool to receive and analyze fluorescence in a second range of wavelengths returning through the same window. At least one of the source or the receiver may be optically coupled to the window through a light guide, and the light guide is formed of materials selected so that the light guide does not emit fluorescence within the second range of wavelength.

Formation evaluation using a windowed cutter may also be carried out by laser-induced breakdown spectroscopy (LIBS). For this, the source is a pulsed laser configured and optically coupled to the window to deliver pulsed energy through the window to a focal point where the laser energy can vaporize material of the formation in contact with the window to create a light emitting plasma and the receiver includes a spectrometer configured to analyze the electromagnetic radiation emitted from the plasma.

Another possibility is Raman spectroscopy. For this the light source may be a laser and the receiver may be similar to a receiver used for fluorescence spectroscopy.

A yet further possibility would be attenuated total reflection spectroscopy which obtains an infrared spectrum, which may be a spectrum in the wavelength range 1900 nm to 2600 nm with only a very small penetration depth into the formation. For this form of spectroscopy infrared light from the source is directed into the window so that it travels laterally within the window by total internal reflection and then returns to the receiver. To do this, the light from the source may be brought to the window along a light guide and light which has travelled along the window the window taken to the receiver along a second light guide. At the interface between the outer surface of the window and the formation, the light undergoes total internal reflection except at wavelengths where the formation has an absorption band.

BRIEF DESCRIPTION OF THE DRAWINGS

FIG. 1 is a diagrammatic illustration of a drill rig in operation to drill a well;

FIG. 4 is a diagrammatic elevational view of the drill bit of FIG. 3, showing cutters on a primary blade at the right and showing a junk slot at the left;

FIG. 5 is a longitudinal section through a cutting element;

FIG. 6 is a corresponding section through a cutting element that includes a window according to some embodiments of the present disclosure;

FIG. 24 is view that is similar to the view of FIG. 23, and shows a construction in which a drill bit and a sub are secured together;

FIG. 25 is a partial view showing a modification to the optical arrangement of FIG. 24.

DETAILED DESCRIPTION

Figure 2:
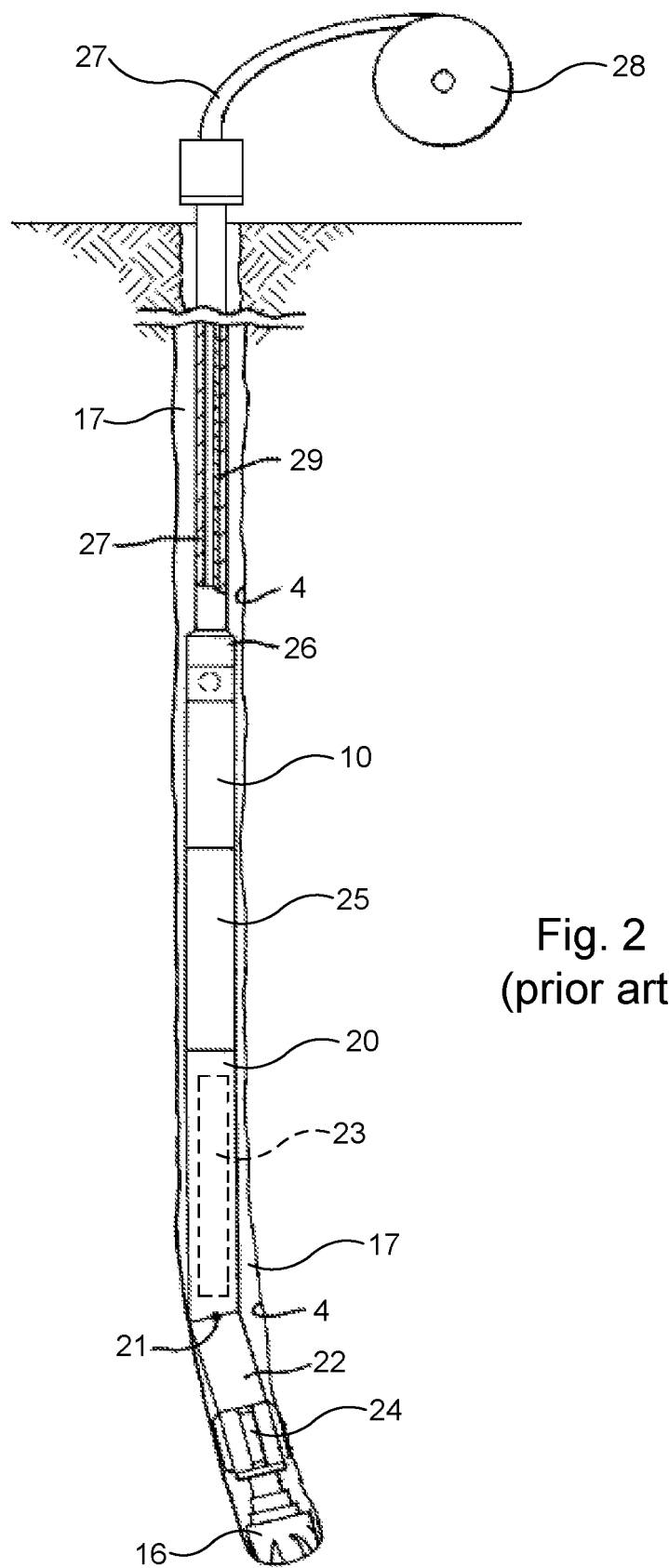
FIG. 2 is a diagrammatic illustration of the use of coiled tubing to drill a well.

Some embodiments of the present disclosure are related to instrumenting rotary cutting equipment used within a wellbore. The wellbore may be a borehole drilled from the Earth's surface (where the surface may ground level at which the ground meets atmosphere or may be a seabed), and through geological formation(s). T cutting equipment may be or may include a drill bit or underreamer whose purpose is to create, extend, or expand a wellbore. In other embodiments, the cutting equipment may be or include milling components for milling casing or other components within a wellbore.

A manner of drilling a wellbore/borehole is illustrated by FIG. 1, which shows by way of example a directionally-drilled wellbore 4 formed through subterranean formation using a drilling assembly. A tubular drill string 6 extends from a drill rig 7 into the borehole 4. At the lower end of the drill string, there is a bottomhole assembly (BHA). In the illustrated example, the BHA includes a logging while drilling (LWD) tool 10, a measuring while drilling (MWD) tool 11, a drill collar 12 attached to or surrounded by a drill collar stabilizer 13, steering system 14 (e.g., rotary steerable system ("RSS"), and a drill bit 16. Such a bottomhole assembly may include other tools, including communication tools, downhole motors, sensor tools, underreamers, and the like.

The drill rig can have a pumping system for pumping drilling fluid from a supply 8 down the drill string 6 and through the BHA to flow out through passages/nozzles in the drill bit 16. The drilling fluid then flows up the annulus 17 around the drill string 6, and to the surface.

FIG. 2 shows another form of drilling, in which a curved section of a borehole 4 is being drilled by a steerable assembly attached to the downhole end of coiled tubing. This assembly includes a bent housing having an upper section 20 joined at bend 21 to a lower section 22. The assembly includes a mud motor 23 in the upper section 20. This motor 23 is connected to a drive shaft 24 that rotates a drill bit 16 mounted below the lower section 22. The upper section 20 of the bent housing is connected to the lower end of an orienting tool 25 that can be operated to set or adjust the tool face angle of the drill bit 16. The orienting tool 24 is attached to the lower end of an LWD tool 10 having a head 26 at its upper end, which allows the BHA (including components 10, 16, 20, 21, 22, 23, and 24) to be suspended on the lower end of a string of coiled tubing 27 that is drawn from a reel 28 at the surface, and which reel 28 may be carried on a truck. An armoured electrical cable or wireline 29 can extend inside the coiled tubing 27 throughout its length and can be used to convey data and instructions between the BHA and the surface. While drilling is in progress, drilling fluid is pumped down the coiled tubing 27 to the motor 22 and the drill bit 16, thereafter returning to the surface along the annulus 17 around the coiled tubing. Although FIG. 2 is illustrated as a coiled tubing system, a bent housing and mud motor may also be used in a system employing segmented drill pipe similar to that used in the system of FIG. 1.

Embodiments of the present disclosure can be used in connection with a drill bit at the end of a BHA as exemplified by FIG. 1 or FIG. 2, at the end of a BHA of some other type used for drilling an underground conduit, or in a reamer or stabilizer that engages the surface of a borehole at a position that is along the length of the BHA. The BHA may or may not include equipment for steering the direction of drilling, exemplified by the RSS shown by FIG. 1 and the bent housing of FIG. 2. This disclosure is not limited to the presence or absence of steerable equipment, nor to any specific type of steerable equipment, when present.

Figure 3:
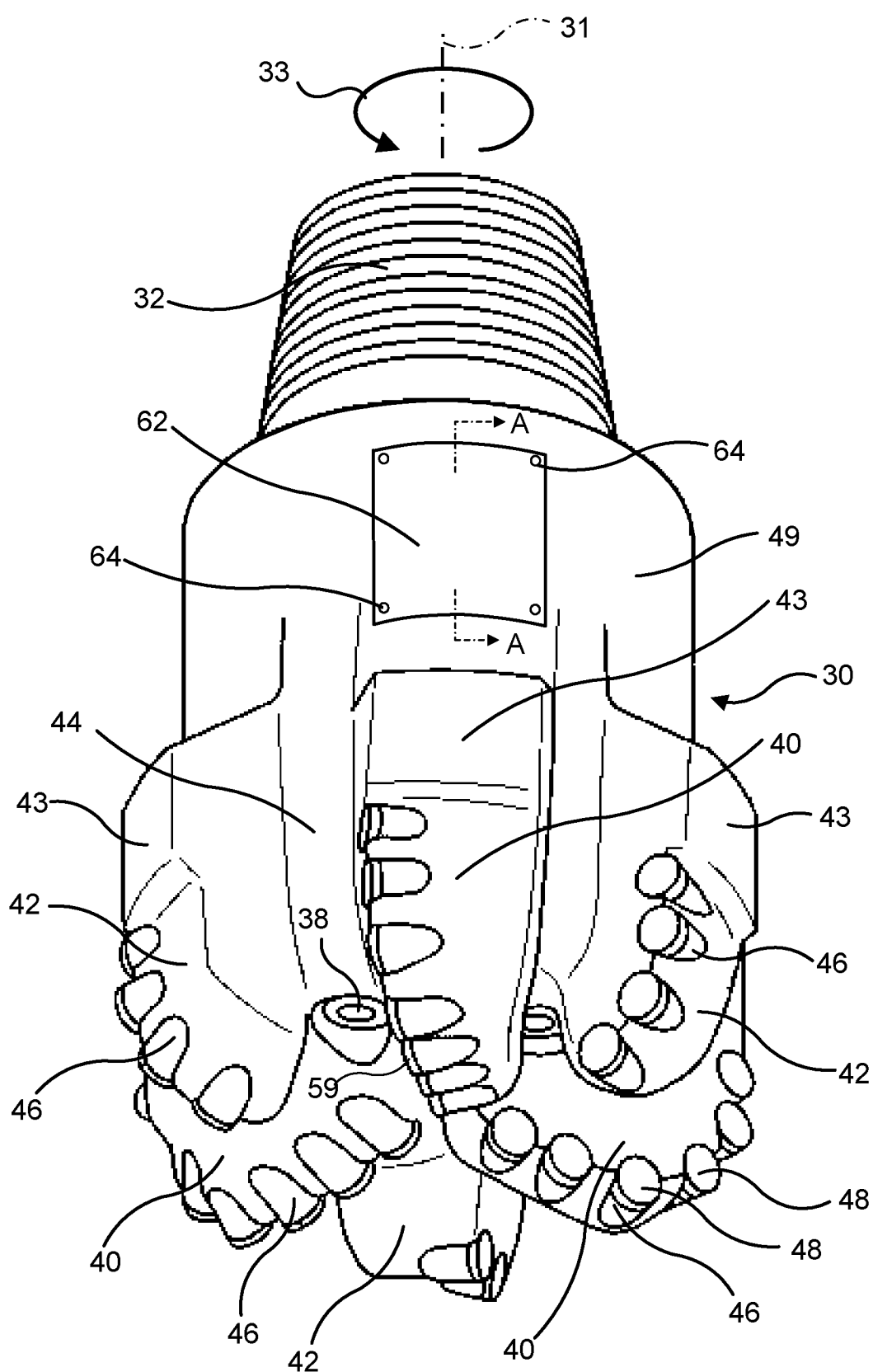
FIG. 3 is a perspective view of a fixed cutter drill bit, and which incorporates a windowed cutter and instrumentation according to embodiments of the present disclosure.

FIG. 3 is a perspective view of an example fixed cutter drill bit fitted with cutting elements (referred to herein as "cutters") for drilling through formations of rock to form a borehole. FIG. 4 is a diagrammatic view of the drill bit of FIG. 3. This drill bit has a main body 30 rigidly connected to a standard pin 32 at its upper end, which is threaded for connecting to the other parts of a BHA, and through them to a drill string or to coiled tubing. The bit has a central axis 31 about which the bit rotates in the cutting direction represented by arrow 33. The body 30 and the pin 32 have a central duct 36, which schematically represented by broken lines in FIG. 4, for flow of drilling fluid pumped down a drill string or coiled tubing. Passages 37 within the interior of the bit body 30 lead the drilling fluid from the central duct 36 to outlet apertures 38 (which may be nozzles or other ports) at the face of the drill bit.

The cutting structure provided on this drill bit includes three angularly spaced apart primary blades 40 alternating with three secondary blades 42. These blades 40,42 are optionally integral with and project from the body 30 of the drill bit. The primary blades 40 begin closer to the axis 31 than the secondary blades 42. These primary blades 40 and secondary blades 42 are angularly separated by channels 44, often referred to as junk slots, for return flow of drilling fluid supplied down a drill string 6 or coiled tubing 27 and flowing through outlet apertures 38. Flow of drilling fluid cools the drill bit and carries away the drilling cuttings, which can flow through the junk slots 44 without balling. The right side of FIG. 4 shows the outline 41 of a primary blade 40. The left side of FIG. 4 shows the outline of the drill bit body at the base of a junk slot 44 while the outline 41 of a primary blade 40 is shown as a dotted line.

The blades 40, 42 have cavities (sometimes called pockets) 46 which extend inwardly from open ends. The open ends can face in the circumferential direction of rotation, although cavities (and thus cutting elements) can be positioned at other orientations, including with an open end generally oriented toward an axial end of the drill bit. Cutters 48 can be secured to the drill bit by brazing the cutter substrate into the pockets 46, with the superhard cutting face of the cutters 48 potentially projecting from the blades 40, 42. The three primary blades 40 can be similar to each other but may differ in the number and position of cutters 48 fitted to them. The secondary blades 42 can also similar to each other but again differ in the number and positions of cutters 48 secured in the pockets of these blades. A cutting profile (not shown) can be illustrated by overlapping the blades so that each cutter from each blade is illustrated in a single, aggregate view. The different positions of the cutters 48 on the blades allow the cutting elements to form a cutting profile that can be generally continuous.

At the upper end of each of the blades 40, 42, there is a pad 43 which has a part cylindrical surface at or near the drill bit's gauge, i.e. at the maximum radius cut by the drill bit. These gauge pads 43 make sliding contact with the wall of the borehole and keep the drill bit stabilized at a central position on the axis of the borehole. Above these gauge pads the drill bit body includes a cylindrical shank 49 with a radius which is smaller than the gauge of the drill bit. Numeral 47 indicates a tapered surface, shoulder, or optional backreaming portion of the drill bit which is at the uphole end of the gauge pads 43 and which surrounds the shank 49.

Drill bit bodies may be made from a number of materials, including steel or tungsten carbide. For instance, tungsten carbide powder may be packed into a mold and infiltrated with molten metal binder. In such an embodiment for the drill bit of FIGS. 3 and 4, the pin 32 may be formed on a steel piece providing the shank 49 which extends into the body and is embedded in the tungsten carbide particles in the mold before infiltration. When molding a drill bit body in this way, the mold may be made from graphite. Interior passageways 36, 37 within the drill bit may be created by placing graphite rods within the cavity defined by the mold and then packing the granular material around such rods.

A drill bit body may also be made by machining a solid piece of material (e.g., steel) to form one or more components of the drill bit. For instance, the bit body 30 and blades 40, 42 may be turned, milled, or otherwise machined from a steel cylinder. Pockets 46 may also be machined on the blades 40, 42, while the central duct 36 and passages 37 may be machined into the bit body 30. The shank 49 may be formed separately and welded to the bit body 30, or may be formed as a unitary unit.

It is also possible to make all or a portion of the drill bit body by using a computer-controlled additive manufacturing method which deposits particulate material of the bit body as a succession of layers in accordance with a digital design. The particles may be bound together and bound to the previous layer with an adhesive as they are deposited. The article made in this way may subsequently be infiltrated with metallic binder which burns off the adhesive. In another additive manufacturing method, a particulate material is again deposited as a succession of layers but as each layer is deposited, its particles are welded together and to the previous layer by a laser or electron beam that can melt a metallic binder.

The cutters 48 in the drill bit can be shearing PDC cutters. As shown in FIG. 5, these have an exposed surface formed of a disc 50, which is customarily referred to as a table and is formed from polycrystalline diamond, giving a superhard exposed surface 51. The diamond table 50 is joined to a cylindrical substrate 52 of tungsten carbide particles infiltrated with a binder metal. This binder may infiltrate both the diamond table 50 and the cylinder 52, uniting them together during manufacture. The substrate 52 may be secured in a pocket 46 in the drill bit body by brazing, although other methods for attaching a cutter to a drill bit body may be used. Additionally, while the superhard polycrystalline diamond material is shown as forming a disc 50 with a flat exposed surface 51, this is illustrative only. The table 50 may instead have other shapes (e.g., different shapes at the interface with the substrate 52 and/or at the exposed surface 51). For instance, the table 50 may be pointed, have grooves or recesses therein, or have any number of other shapes.

FIG. 6 shows a cutter with a window which may be used in some embodiments of the present disclosure. The window 56 is positioned in an aperture through the diamond table 50 so that the exterior face 55 of the window is optionally aligned to be coplanar with the exterior face 51 of the polycrystalline diamond table 50. This aperture in the table 50 may be formed by electric discharge machining and may be at an off-center position as shown in FIGS. 4 and 6, although it may be centered in other embodiments. According to an illustrative embodiment, the window may be made of monocrystalline synthetic diamond produced by chemical vapor deposition. One supplier of optically transparent synthetic diamond is Element Six Ltd of Ascot, Berkshire, UK and Santa Clara, California, USA. The window may be fastened in the aperture in the polycrystalline diamond table 50 by brazing or other manners, so that there is optionally a watertight seal between the window 56 and the diamond table 50 into which it is set. Although brazing can be used to secure cutters, it is also possible that a cutter could be secured with an epoxy or other adhesive or by a mechanical fastening arrangement.

The diamond table 50 containing the window 56 is secured to a cylindrical substrate 52 of tungsten carbide. The substrate 52 can be secured to a steel cylinder in some embodiments. However, the cylinder 52 can be made with an aperture that is aligned with the window 50, thereby creating a passageway 58 through the cutter to the inside face 57 of the window 56.

As shown by FIG. 4, a windowed cutter 59 of the type shown by FIG. 6 can be fitted to a blade 40 of the drill bit. The location on the drill bit may vary, and may be in a nose or shoulder location in some embodiments, so as to be at the axially leading part of the drill bit. This location can be radially intermediate inmost and outermost cutters 48 on a blade 40, 42, as well as radially intermediate and between the inmost and outermost of all the cutters 48 on the drill bit. The windowed cutter 59 can be fitted to the drill bit with its window 56 in the lower part of the exposed hard face of the cutter. Consequently, the exposed outer face 55 of the window 56 will be in direct contact or near direct contact with formation rock as the drill bit is rotated to extend the borehole. Depending on the depth of the cut in the formation, the window 56 may be positioned in other manners. For instance, with a deeper depth of cut, the window 56 may be positioned farther from the cutting tip 61 of the cutter 59. Thus, in some embodiments, a center of the window 56 may be positioned between the center of the cutter 59 and the cutting tip 61. For instance, distance between a center of the window 56 and the central axis of the cutter 59 (window distance 63 in FIG. 6) is in some embodiments between 5% and 75% of the distance between the center of the window 56 and the cutting tip 61 (cutter width/radius 65 in FIG. 6). In more particular embodiments, the window distance 63 may be between 20% and 50%, or between 25% and 40% of the cutter width 65. In still other embodiments, the window distance 63 may be less than 5% or greater than 75% of the cutter width 65.

In FIG. 6, the center of the window 56 is positioned between the cutter tip 61 and a center of the cutter 59; however, in other embodiments the center of the cutter 59 may be positioned between the window 56 and the cutter tip 61. For instance, where the cutter 59 is expected to have a high depth of cut (e.g., due to high weight-on bit, softer formation, etc.), the window 56 is optionally farther from the cutter tip 61. In FIG. 6, an optional position of the window 56 and passageway 58 when the window 56 is farther from the cutting tip 61 is shown in dashed lines.

Figure 8:
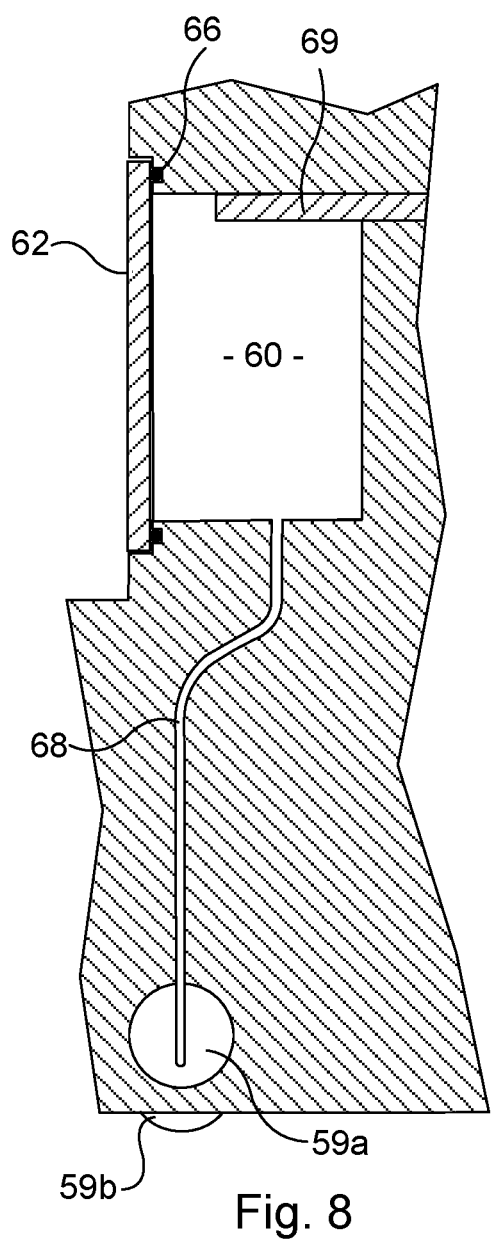
FIG. 8 is a diagrammatic section perpendicular to FIG. 7, showing entry to the windowed cutting element.
Figure 9:
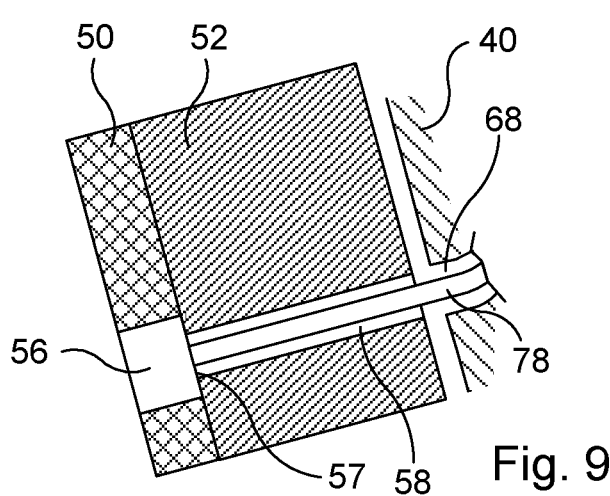
FIG. 9 is an enlarged longitudinal section through a windowed cutting element such as that of FIGS. 7 and 8 with a light guide in place according to embodiments of the present disclosure.

Returning to FIG. 4, in the shank 49 or elsewhere in the drill bit, there may be a cavity 60 which houses optics and other instrumentation for use with the windowed cutter 59. Access to this instrument cavity 60 is optionally provided by a cover 62, seen in FIGS. 3, 4, and 8, and which can be held in place by 64, welding, or in other manners. A hermetic or fluid seal to the shank of the drill bit is indicated at 66. This cavity 60 can be connected to a passageway 68 through the body of the drill bit, which leads to the passageway 58 through the windowed cutter 59. This passageway 58 may be separate from a fluid channel in the bit and may be designed to have no fluid therein, to have a different fluid from the main drilling fluid, or to have a lesser amount of fluid. The cavity 60 and passageway 68 are also seen in FIG. 8 where the end of the cutter 59 inside the blade 40 is indicated as 59a and a portion of the cutter 59 which projects from the blade 40 is indicated as 59b. A block 69 (e.g., made of brass or copper) can extend from the cavity 60 through the body of the drill bit and project slightly into the duct 36 carrying drilling fluid which is being pumped from the surface to the drill bit. This block provides a thermally conductive path carrying heat from the cavity 60 to be dissipated into the flow of drilling fluid.

Figure 10:
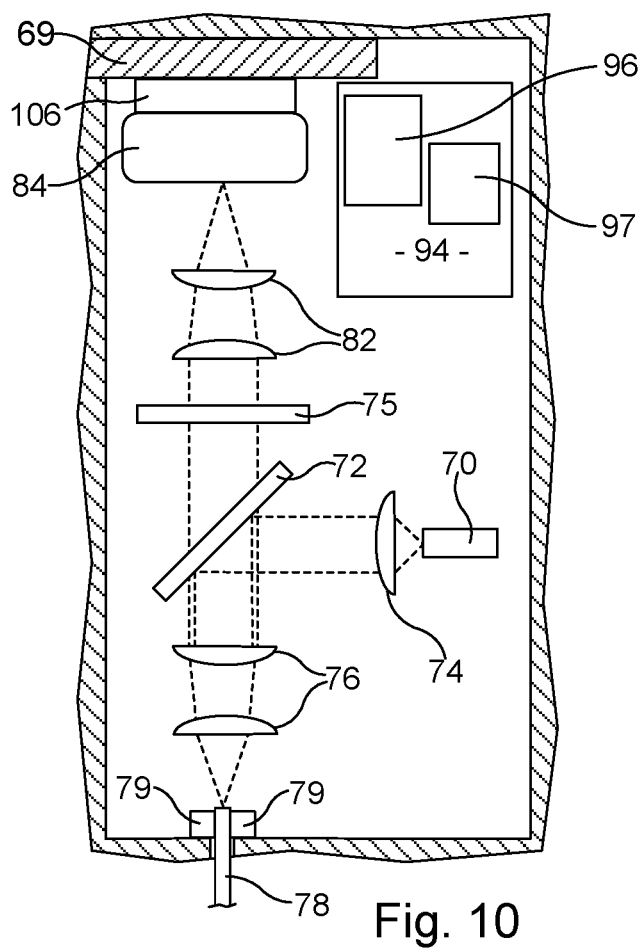
FIG. 10 is a schematic view of an instrument and shows the components located within the instrument cavity to carry out fluorescence spectroscopy.

FIG. 10 shows equipment that can be fitted in the cavity 60 to carry out fluorescence spectroscopy for evaluation of the formation as it is being cut. There is a light source which may include a light emitting diode (LED) 70 that emits light over a band of wavelengths. In some embodiments, the maximum wavelength may be between 300 nm and 500 nm (e.g., 385 nm.) A mirror 72 (e.g., a long pass dichroic mirror) can be reflective for light with wavelengths shorter than a cut-on wavelength (e.g., 410 nm) and transmissive for wavelengths longer than this cut-on wavelength. The light from the LED 70 can be directed onto this mirror 72 by lens 74, and light from the diode with wavelength shorter than the cut-on wavelength is reflected towards lens system 76 which focuses the light into an optical fiber 78 running through the passageways 68 and 58 to the interior face 57 of the window 56. The light emerging from the fiber 78 passes through the window 56 onto the formation or other material being cut. The fiber 78 is gripped between opposed jaws 79 of a clamp or vice, and is thereby held in place relative to the cavity 60 and the optical parts therein.

This light directed onto the workpiece being cut will excite fluorescence when a fluorescent material such as oil is present. Much of this fluorescence occurs at wavelengths which are longer than the wavelengths of the excitation light and longer than the 410 nm cut-on wavelength of an example dichroic mirror. This fluorescence returns along the optical fiber 78 to the receiving equipment in the cavity 60. It can be directed by the lens system 76 onto the dichroic mirror 72 and can pass straight through that mirror. It is then focused by lens system 82 onto the light inlet of a microspectrometer 84.

Figure 11:
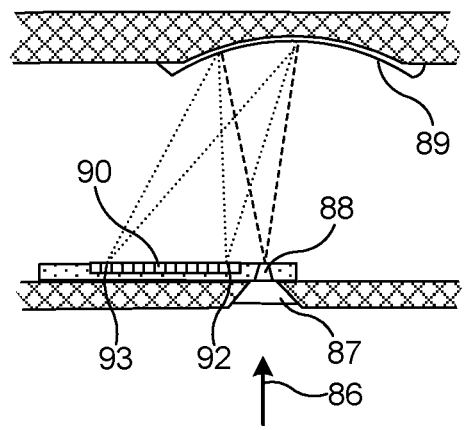
FIG. 11 is a detail showing an example layout of a microspectrometer.

The internal layout of this microspectrometer is shown in FIG. 11. Light coming from the lens system 82 in the direction shown by arrow 86 enters through a window 87 and an inlet slit 88 and falls onto a diffraction grating 89 positioned on a curved mirror surface so that the mirror surface is immediately behind the grating 89. The grating 89 turns the direction of the light through an angle that can be dependent on wavelength, so that the light is split into a spectrum. At the same time, the mirror may focus the light onto a linear array of semiconductor light sensors 90 at one side of the inlet slit 87. This is illustrated in FIG. 11 for two wavelengths. Light at the blue end of the visible spectrum, for instance, would be focused onto a point 92. Light at the red end of the visible spectrum, for instance, would be focused onto a point 93. Light at intermediate wavelengths of the visible spectrum would be focused onto points between points 92 and 93. The semiconductor sensors in the array 90 can be small complementary metal-oxide-semiconductor (CMOS) devices, each of which receives light within a small range of wavelengths. Outputs from these CMOS sensors can be connected to an electronics package 94 including a microprocessor 96 to convert the measurements from the CMOS sensors into digital data, although some preliminary processing of the data from the array of sensors may be carried out by circuitry within the microspectromer itself. The data can be stored in local or remote data storage on the drill bit or another tool. In some embodiments, the data is transmitted by a transmitter 97 within the electronics package to a receiver elsewhere in the BHA, for instance to an MWD or LWD tool 11 such as shown in FIG. 1 or 2, which is able to transmit data to the surface via mud pulse telemetry, wired drill pipe, or in other manners.

Figure 12:
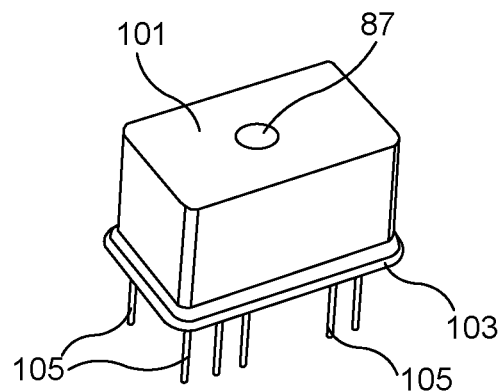
FIG. 12 is a perspective view of a hermetically sealed microspectrometer, according to an embodiment of the present disclosure.

The microspectrometer 84 is constructed as an electronic component, illustrated by the perspective view FIG. 12. This arrangement can include a metal case 101 that is hermetically sealed to a base 103. The parts 88, 89, and 90 of the microspectrometer shown in FIG. 11 are enclosed within the case 101 and the window 87 for admission of light returning from the formation is provided in the top of the case 101. Outputs from the array of semiconductor light sensors 90 can be pre-processed by circuitry within the case 101 and electrical connections to this circuitry are made through pins 105 projecting from the underside of the base 103. These pins 105 can be soldered to a printed circuit board within the cavity 60. Hermetically sealed microspectrometers having these characteristics are available from Hamamatsu Corporation, Bridgewater, New Jersey, USA and Hamamatsu Photonics UK Limited, Welwyn Garden City, Hertfordshire, UK.

An arrangement in which light at excitation wavelengths is used to stimulate fluorescence at longer wavelengths can occur in fluorescence microscopy where the fluorescence is viewed by eye. In the equipment described here the fluorescence is analyzed with the microspectrometer 84 so as to measure the intensity of the fluorescence within each of a plurality of narrow wavebands. In order to restrict or even prevent the microspectrometer from being saturated by any reflected excitation light, the beam which passes through the dichroic mirror 72 can also be also passed through a dichroic filter 75 which blocks light with wavelengths shorter than a boundary wavelength (e.g., of 425 nm). That boundary wavelength may be chosen to be slightly longer then the cut-on wavelength of the dichroic mirror 72.

The optical fiber 78 that is used may be selected to avoid materials which generate fluorescence within the fiber. We have observed that some cladding materials used for optical fibers do produce such autofluorescence. A fiber type which we have found satisfactory has a silica glass core within a polyimide cladding. Such fibers are available from Thorlabs Inc, Newton, New Jersey, USA and Thorlabs Ltd, Ely, UK. Another possibility is to employ an optical fiber with a silica core and a reflective metallic cladding. Gold and aluminium are suitable metallic cladding materials, and are also available from Thorlabs Inc and Thorlabs Ltd.

A feature of the arrangement described above is that it protects sensitive components from damaging temperatures resulting from heating of the cutters while drilling. The diamond window 56 in the cutter 60 has similar heat tolerance to the polycrystalline diamond of the diamond table 50. The silica glass of the optical fiber can withstand considerable temperatures, and a polyimide cladding can withstand temperatures up to 250° C. while metallic cladding can withstand even higher temperatures.

The instrumentation cavity 60 may be spaced away from the cutters and optionally located in an upper part of the drill bit, to be cooled by the flowing drilling fluid. Additionally, the microspectrometer 84 may be given positive cooling by a Peltier cooler 106, placed against or near the microspectrometer 84. The hot side of the Peltier cooler 106 can be in thermal contact with the block 69. The Peltier cooler 106 and the block 69 constitute an active cooling system for transferring heat away from the microspectrometer 84 to the flow of drilling fluid in duct 36.

Another feature of the arrangement shown here is that a windowed cutter can be used in a part of a blade of a drill bit and project from the main body of the drill bit. This can be appreciated from the diagrammatic views shown as FIG. 7. The bit body surface 110 can contain the fluid outlets 38. The blade 40 projects downwardly from this surface and includes leading 112 and trailing 113 surfaces. The amount of space between the cutter 59 and the trailing surface 113 of the blade can be limited. Creating a cavity behind the cutter with sufficient size to accommodate instrumentation could weaken the blade. The arrangement shown avoids this by placing the instrument cavity 60 elsewhere in the drill bit and using optical fiber 78 to connect the cutter 59 to the cavity 60.

The arrangement shown also provides for insertion of the optical fiber via the cavity 60 after the cutter 59 has been fastened in place in the bit body. When putting optical fiber in place, bending the fiber excessively can damage the fiber (especially its light carrying core). When optical fiber is used for communications (see ANSI/TIA 568 standard for communications cable), care should be taken to avoid bending the fibre with a radius of curvature less than ten times the fiber diameter.

Figure 13:
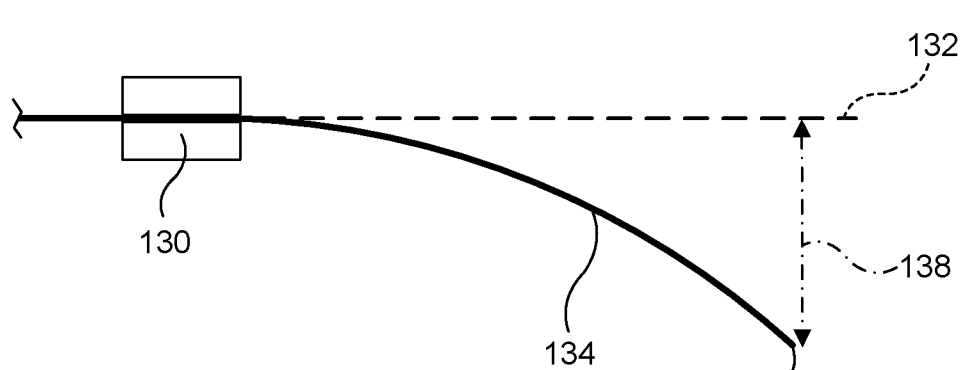
FIG. 13 diagrammatically shows a test of the flexibility and stiffness of a light guide.

The optical fiber used in this embodiment has resilience so that it displays flexibility which allows it to bend while complying with such a limitation concerning curvature, but it also tends to spring back from bending when it is free to do so. The fiber also displays stiffness, which can be observed with a simple test illustrated by FIG. 13. A length of the optical fiber is clamped at 130 so that an end portion 134 of the fiber, terminating at end 136, is cantilevered and projects horizontally from the clamp 110. The projecting length is set at 10 cm and a horizontal line from the clamp 110 is shown as dashed line 132. The projecting length 134 of the fiber may curve downwardly from the horizontal under its own weight as shown, but the stiffness of the fiber is such that the vertical distance 138 from the horizontal line 132 to the end 136 of the fiber does not exceed 5 cm. In this test, the vertical fall may be said to be 50% of the horizontal lead. Other fibers that may be used may have a vertical fall that is between 35% (3.5 cm drop over a 10 cm length) and 70% (7 cm drop over a 10 cm length) of the horizontal lead.

Figure 7:
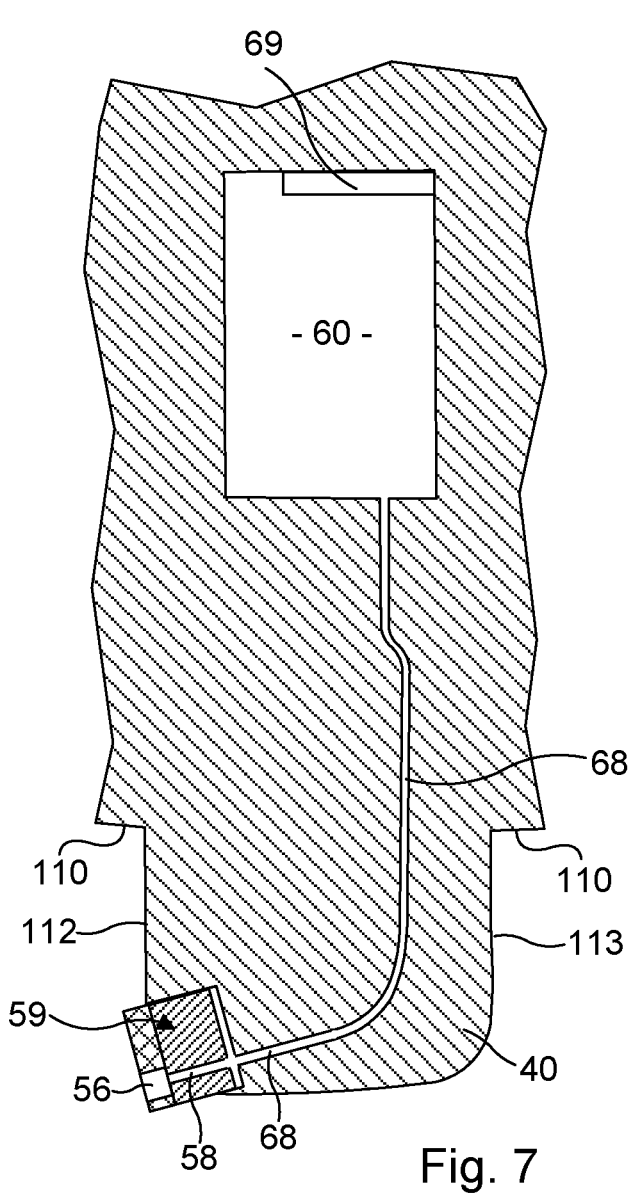
FIG. 7 is a diagrammatic sectional view extending through a windowed cutting element and instrument cavity such as that shown in FIG. 4.

The passageway 68 from the cavity 60 to the passageway 58 through the cutter 59 can be arranged and designed to guide insertion of an optical fiber with this characteristic of flexibility and resilience. This passageway does not necessarily lie in a single plane. Diagrammatic illustration of this passageway in FIGS. 7 and 8 shows that the passageway may avoid abrupt/sharp turns. Where there is a change in direction, there may be smooth curves optionally having a radius of curvature which is at least ten times the diameter of the fiber 78.

Figure 14:
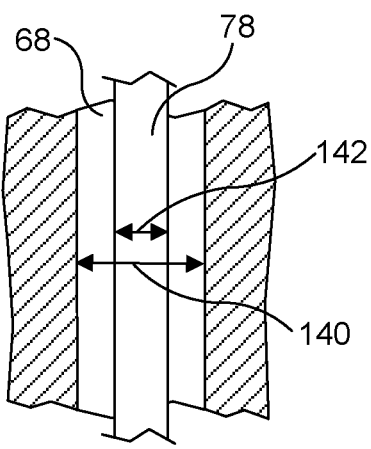
FIG. 14 is an enlarged portion of a passageway with a light guide in the passageway.

The passageway may be dimensioned to allow the optical fiber to be a loose fit therein. Referring to the enlarged view which is FIG. 14, the width 140 across the passageway 68 may be at least twice but less than five times the diameter 142 of the optical fiber 78. Consequently, the cross-sectional area of the passage way 68 can be between four and twenty-five times the cross-sectional area of the fiber 78. These properties and relative dimensions of the fiber and the passageway allow the optical fiber to be pushed along the passageway 68 from the cavity 60 and then along the passageway 58 until the end of the fiber reaches the inside face 57 of the window, without allowing or requiring the fiber to bend to a radius less than ten times the fiber diameter.

Figure 15:
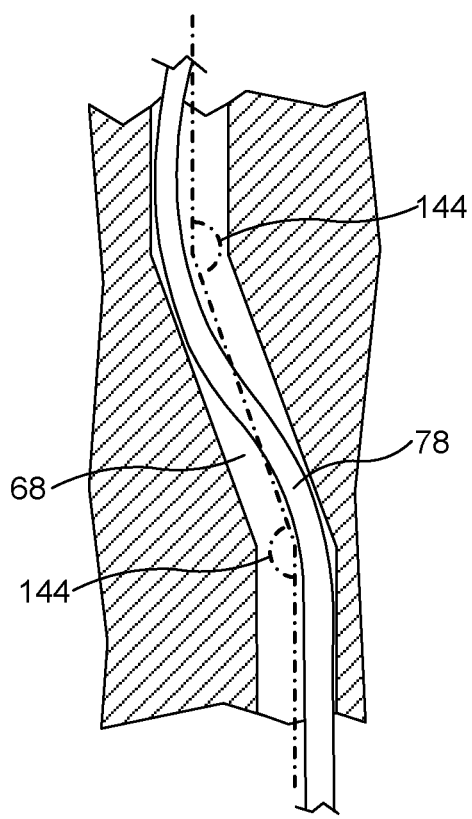
FIG. 15 is detail of a light guide at bends in the passageway through a drill body, according to embodiments of the present disclosure.

Whereas FIGS. 7 and 8 show a passageway 68 which extends through the body of the drill bit with straight sections connected by smoothly curved bends, FIG. 15 shows a different possibility. The centre line of the passageway is shown chain dotted. Bends in the passageway 68 are formed with straight sections meeting at oblique angles 144. These angles 144 may be greater than 120° and possibly greater than 135°. This also allows the fiber 78 to bend without bending to a radius less than ten times the fiber diameter.

Because the fiber is not a tight fit within the passageway 68, slight bending of the fiber within the passageway 68 has the consequence that the fiber has bent slightly away from the shortest possible path along the passageway 68. The length of the fiber 78 fitted between the optical instrumentation in the cavity 60 and the window 56 may be deliberately arranged such that such slight bending within the cavity 68 does occur. As a result, as the resilience of the fiber tries to spring back from bending, the end of the fiber presses on the inside face 57 of the window 56. The end of the fiber at the cavity 60 is held in place by the clamping jaws 79 and so the fiber is maintained with slight bending of the fiber within the passageway 68 and consequently is maintained pressing onto the inside face 57 of the window 56.

Figure 16:
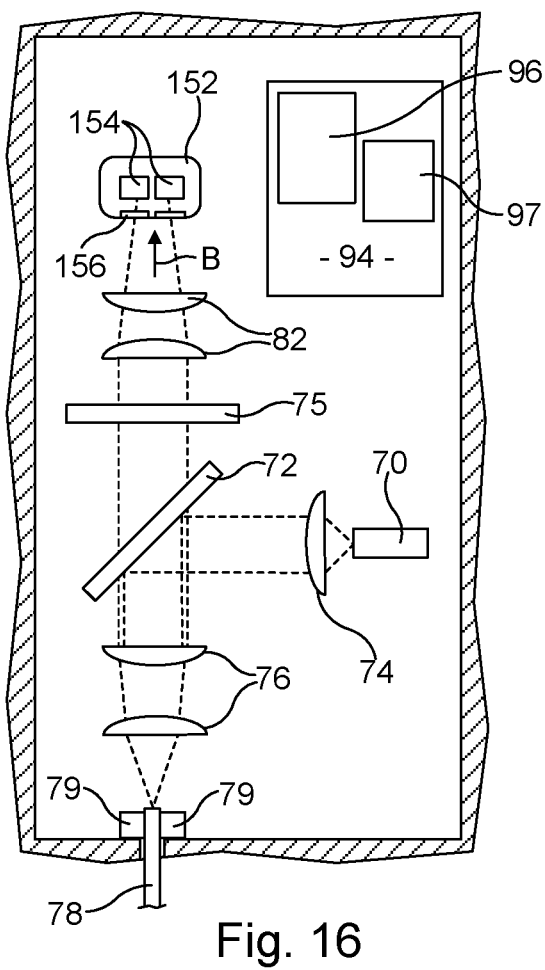
FIG. 16 is a view analogous to that of FIG. 10, showing a microspectrometer which includes an array of filters and sensors.
Figure 17:
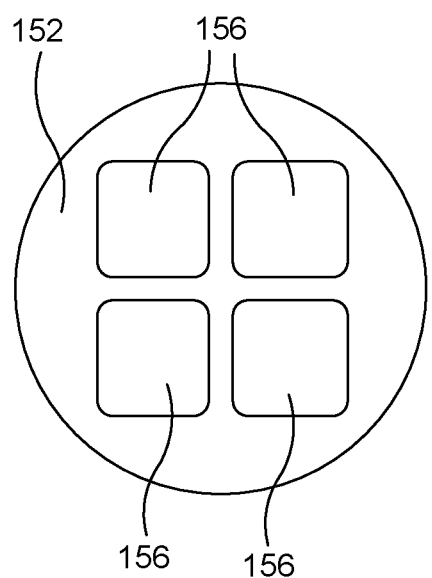
FIG. 17 is a view onto a microspectrometer in the direction of arrow B of FIG. 16, showing an array of four filters.

FIGS. 16 and 17 show a different optical arrangement within instrument cavity 60. The microspectrometer 84 is replaced by a component 152 incorporating four semiconductor light sensors 154, each of which is behind a filter 156 for a band of wavelengths. The four filters 156 are arranged in a square as shown in FIG. 17 and face the fluorescence arriving through the lens system 82. The four filters 156 pass four different bands of wavelengths, which do not overlap with each other. Thus, the fluorescence is analyzed at each of four different bands of wavelengths. The outputs from the sensors are connected to the electronics package 94 which converts the measured intensities to digital data.

Figure 18:
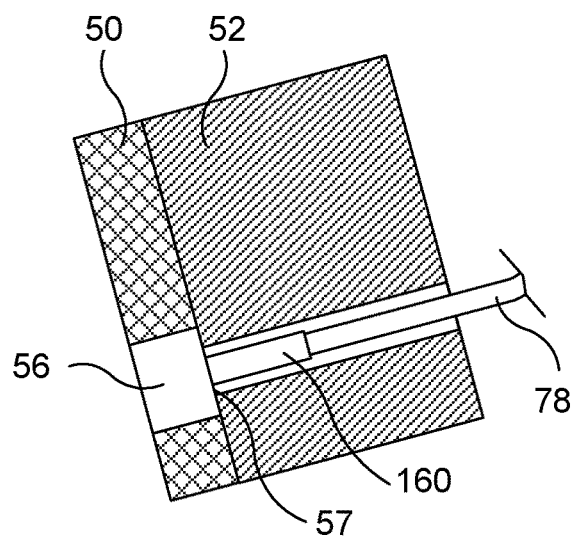
FIG. 18 is an enlarged longitudinal section through a windowed cutting element showing an optical fiber with an end fitting.

FIG. 18 shows the possibility of a termination fitting 160 containing a system of lenses positioned at the end of the fiber 78 so as to lie between the end of the fiber 78 and the inside face 57 of the window 56. The fitting 160 may be attached to the fiber 78. The length of the fiber 78 may be arranged such that when it has been put in place it presses the end fitting 160 against the inside face 57 of the window 56.

A slightly modified version of the constructional arrangement such as shown by FIGS. 4 to 12 could be used for carrying out Raman spectroscopy. The light source 70 would be replaced with a laser and the dichroic mirror 72 and filter 75 would have cut-on and/or cut-off wavelengths chosen to restrict and potentially prevent reflected excitation light from the laser light source from reaching the microspectrometer.

Figure 19:
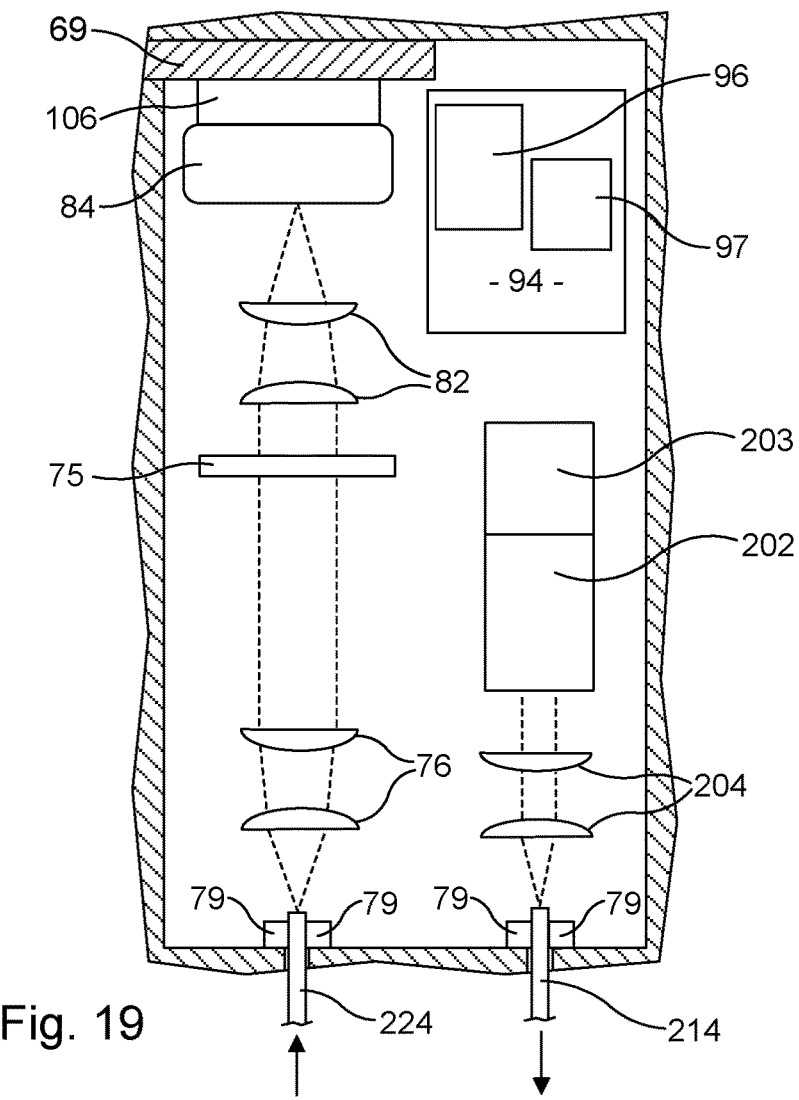
FIG. 19 is a view analogous to the view of FIG. 10, showing components in an instrument cavity, and which can be used for laser-induced breakdown spectroscopy.

FIG. 19 shows the items located in the instrument cavity 60 in an embodiment which carries out formation evaluation by laser induced breakdown spectroscopy. In this technique the light source can include a Neodymium-doped yttrium aluminium garnet (Nd:YAG) pulsed laser 202 operated by the electronics package 94 to deliver energetic pulses with a duration (e.g., 1 to 2 nanoseconds) and with a desired energy (e.g., 5 to 6 mJ) in each pulse. These are emitted at a suitable frequency (e.g., 50 pulses per second (i.e. 50 Hz)). It may be noted that although these are powerful laser pulses, the power output averaged over time is modest. The laser may be a Q-switched Nd:YAG laser pumped by a laser diode 203.

The windowed cutter 209 may be located in a drill bit at the position shown by numeral 59 in FIG. 4. As shown by the enlarged view of FIG. 21, this windowed cutter 209 can have a transparent diamond window 56 in a polycrystalline diamond table 50 as with the windowed cutter 59 described above, but it is formed with two passageways 210 and 212 extending separately through a portion of the cutter and meeting at or near the inside surface 57 of the window 56. The end of the substrate of the cutter 209 inside the blade 40 is indicated as 209a in FIG. 20 and a portion of the cutter 209 which projects from the blade 40 is indicated as 209b.

Figure 20:
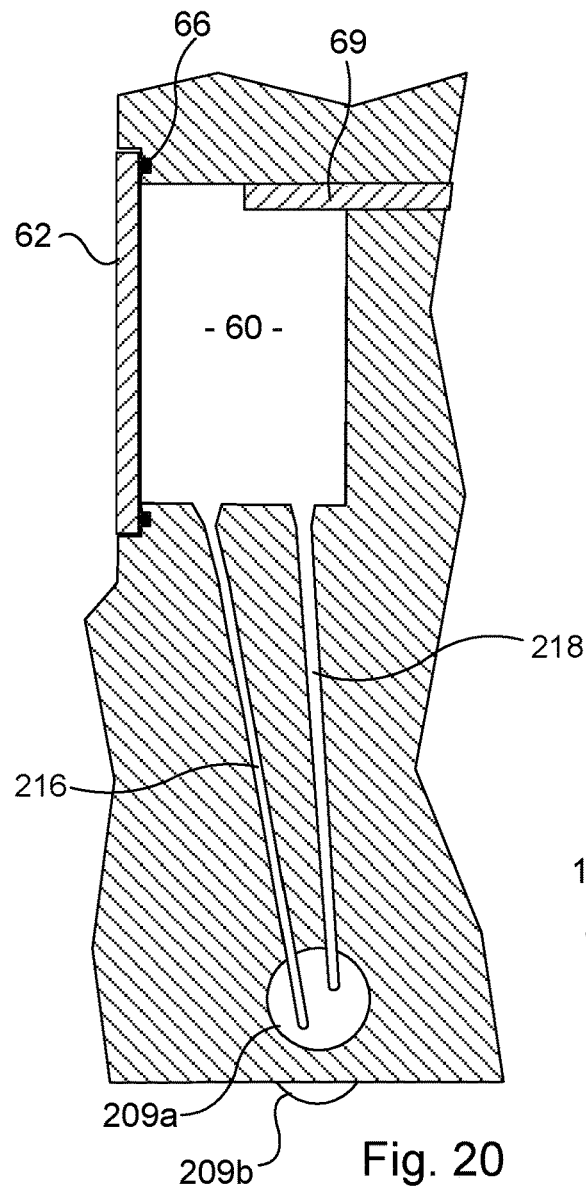
FIG. 20 is a diagrammatic sectional view analogous to the view of FIG. 8, showing a windowed cutter and passageways through a drill bit body when instrumentation is in the cavity is as shown by FIG. 19.
Figure 21:
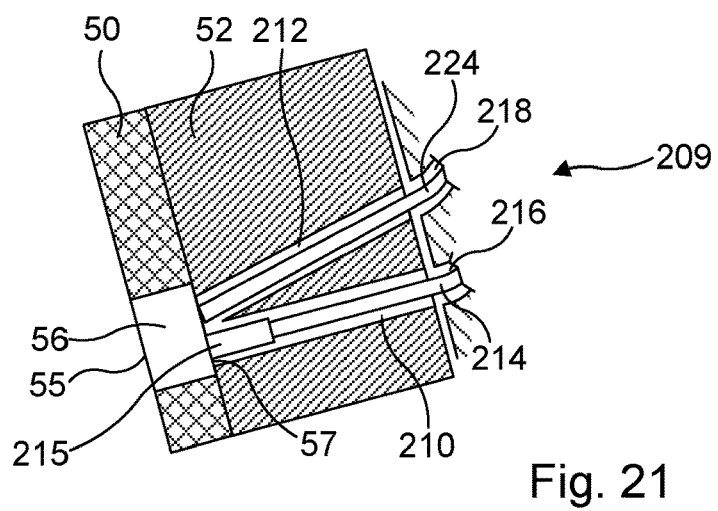
FIG. 21 is an enlarged longitudinal section through a windowed cutting element such as that shown in in FIG. 20, with light guides in place according to embodiments of the present disclosure.

Referring again to FIG. 19, the pulses from laser 202 are focused by lens system 204 into a light guide 214 which is a hollow optical fiber such as disclosed by Matsuura et al referenced above. This light guide 214 leads through a passageway 216 formed in the drill bit, as shown in FIG. 20 and into the passageway 210 through the cutter 209. A lens system in a fitting 215 at the end of this hollow fiber focuses the laser beam to a desired diameter (e.g., approximately 50 µm) at the cutting surface 55 of the diamond window 56. The energy of the laser pulse concentrated at the face of the formation being cut yields sufficient power density to vaporize a small amount of the formation material and strip atomic electrons from nuclei, creating a plasma. As this plasma cools over a subsequent fraction of a second before the arrival of the next laser pulse, the electrons recombine with atomic nuclei and emit light, at least some of which lies in the spectrum from ultra violet through to infrared (i.e., from 100 nm to 2000 nm wavelength). Some of this emitted light travels along an optical fiber 224 or other light guide leading through passageway 212 of the cutter and through a passageway 218 formed in the drill bit. This optical fiber may be of the same type as the fiber 78 described elsewhere herein. The light arriving in the cavity 60 can be focused by lens systems 76 and 82 into the light inlet of microspectrometer 84 as is also described herein. The filter 75 may be chosen to block any reflected light at the wavelength of the laser pulses, although in this form of spectroscopy the returning light may be emitted only after a laser pulse has created the plasma which emits the light.

The light guides 214 and 224 may each have a similar combination of flexibility and stiffness to the fiber 78 described above. The configuration of the passageways 216, 218 and the dimensions of these passageways relative to dimensions of the light guides within them may be in accordance with the features described above for fiber 78 within passageway 68.

Figure 22:
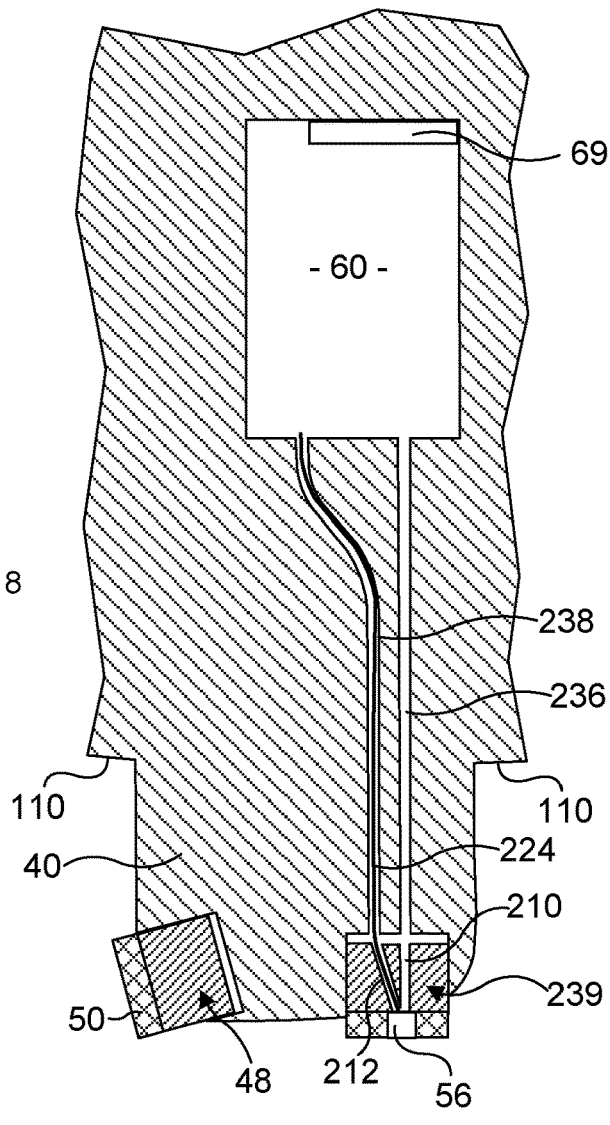
FIG. 22 is a diagrammatic sectional view analogous to the view of FIG. 7, with a light guide extending through a cutting element and instrument cavity.

FIG. 22 is a diagrammatic section through a drill bit blade, analogous to FIG. 7. The optical and electronic components in the cavity 60 are as shown in FIG. 19. Differences from the embodiments described above can be found in the windowed element which contacts the formation and the travel of light to the window. A windowed element 239 (e.g., a cutter or gauge protection element having a hard outer surface) has the same construction as the windowed cutter 209 shown in FIG. 21, but is positioned in a blade 40 so as to follow behind the conventional cutters 48 and scrape across newly cut formation surface. As in the embodiment of FIGS. 20 and 21, there are two passageways 236, 238 extending between the windowed element 239 and the instrumentation cavity 60. Passageway 236 is straight and is aligned with the passageway 210 through the windowed element 239. These passageways 210, 236 optionally do not contain any light guide and provide a straight light path from the cavity 60 to the window 56 of the element 239. The pulsed beam from the laser 202 extends down these empty passageways 210, 236, passes through the window 56 and creates a small amount of plasma from formation outside the window 56. Some of the light emitted from the plasma travels along an optical fiber 224 which runs along the passageways 212 and 238 to a receiver in the cavity 60. Although the optical fibers 214 and 224 are not shown in FIG. 20, the optical fiber 224 is shown as a line in FIG. 22. As mentioned, there may be no fiber within the straight passage 236 of FIG. 22. This constructional arrangement could be used for fluorescence spectroscopy, using a ultraviolet (UV) laser as the light source. This UV laser could be positioned to direct its beam along the passageway 236 and fluorescence would be carried to a receiver in the instrumentation cavity 60 by the optical fiber 224.

Figure 23:
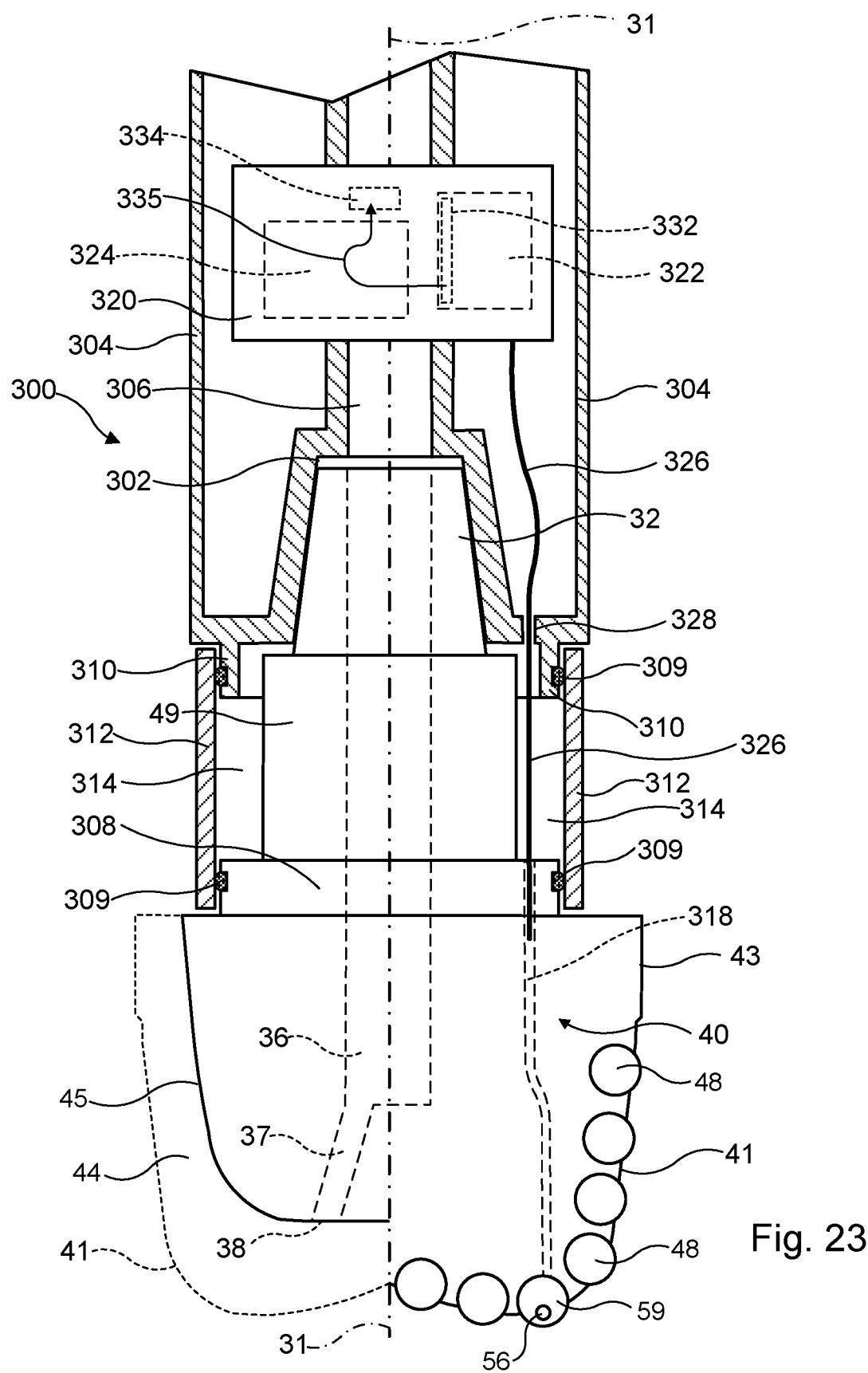
FIG. 23 is a view analogous to the view of FIG. 4, showing a drill bit attached to a discrete sub that houses electronic and optical components.

FIG. 23 shows an arrangement using a drill bit which is similar to the drill bit in FIG. 4 but with the instrumentation is located in a discrete sub 300 to which the drill bit is attached and which forms part of the BHA. The drill bit is shown in the same manner as in FIG. 4. The main structure of the sub 300 is shown as a sectional view. When used in an arrangement as shown in FIG. 1, this sub 300 could be interposed between the drill bit 16 and an RSS 14. When used in other equipment with a rig and drill string, the sub 300 would be interposed between the drill bit and the remainder of the BHA. When used in coiled tubing drilling or mud motor drilling system as in FIG. 2 the sub 300 could be interposed between the drill bit 17 and the drive shaft 24 (or the drive shaft could extend through the sub 30), and hence between the drill bit and the lower portion 22 of the bent housing 20.

The sub 300 has a box 302, with a tapered female thread which receives the pin 32 of the drill bit. The opposite end of the sub, which is not shown in FIG. 23, can have a pin with a tapered male thread similar to that of the pin 32 and which is used to attach the sub 300 to the immediately above component of the BHA. This sub 300 has an exterior wall 304 and a central duct 306 for flow of drilling fluid into the duct 36 of the drill bit.

The shape and construction of the drill bit can be similar to that of the drill bit shown by FIGS. 3 and 4 and the same reference numerals are used. One difference is that the body of this drill bit includes an optional cylindrical step section 308 which has a radius less than that of the gauge pads 43 but greater than the radius of the shank 49. An elastomeric sealing ring 309 optionally is fitted in a groove around the step 308. At its end adjoining the drill bit, the sub 300 has a cylindrical projection 310 with the same external radius as step 308. This is also surrounded by a sealing ring 309. The drill bit and the sub 300 are attached together by inserting pin 32 into box 302 and tightening with an iron roughneck, power tongs, or in another suitable manner. This is not impeded by the presence of the step 308 and projection 310.

Once the drill bit has been attached to the sub 300, a collar 312 made of two semi-cylinders, can be fitted around the section 308 and the projection 310, thereby enclosing an annular cavity 314 around the shank 49. The semi-cylindrical halves of the collar 312 press against the sealing rings 309 so that cavity 314 is a sealed chamber.

The drill bit has a windowed cutter 56 fitted to it as shown in FIG. 4 (although more than one windowed cutter could be used) and it has a passageway 318 leading through the body of the drill bit to this cutter. This passageway extends through the step section 308 of the drill bit and opens into the cavity 314.

After the drill bit has been attached to the sub 300 but before the collar 312 is fitted, an instrument unit 320 may be mounted in the sub 300, using removable access panels (not shown in FIG. 23) through the exterior wall 304 of the sub. The instrument unit 320 can contain a thermally insulated chamber 322 with optical and electronic components which are the same as or similar to those shown in FIG. 10 (e.g., light source 70, lenses 74, 76, and 82, dichroic mirror 72, microspectrometer 84, and electronics package 94). The instrument unit 320 also contains cooling equipment 324 for active cooling of the cavity 322 in order to restrict or prevent the temperature within cavity 322 from exceeding the tolerance of the electronic components within it. Some methods for active cooling of downhole electronics are described in U.S. Pat. Nos. 6,769,487 and 9,932,817, International Patent Publication No. WO2006/065559, and Society of Petroleum Engineers paper SPE159737, each of which is incorporated herein by this reference.

In this example embodiment, the active cooling equipment 324 conveys heat as indicated by arrow 335 away from a copper block or other thermally conductive element 332 in the chamber 322 and dissipates the extracted heat into a thermally conductive element 334 which extends into or through the wall of duct 306 and so is in thermal contact with the flow of drilling fluid coming from the surface along the duct 306. The active cooling equipment 324 may be a refrigeration system utilizing phase change of a refrigerant, or may be a Peltier cooler or a succession of Peltier coolers. Electrical power for the cooling system 324 and the instrumentation in chamber 322 may be generated within the sub 300 using the flow of drilling fluid in duct 306 or the temperature differential between the fluid in duct 306 and the returning fluid outside the sub 300 as energy sources. Example methods of such power generation are described in SPE 176777, U.S. Pat. No. 8,853,879 and U.S. Patent Publication No. 2015/0218900, each of which is incorporated herein by this reference. It will be appreciated that as an alternative, an active cooling system could be configured to convey heat from chamber 322 to the flow of drilling fluid returning to the surface.

A light guide 326 is fitted, extending from the chamber 322 through a hole 328 in the end wall of the sub 300 into the cavity 314, then through the cavity 314 and the passageway 318 to the inside face 57 of the window 56 in the cutter 59. With respect to the illustrated embodiment, most of the light guide 326 within the passageway 318 has been omitted from FIG. 23 so that the passageway 318 can be seen more clearly. This light guide 326 could be a single length of optical fiber, or it could be an optical fiber running from the chamber 322 to the cavity 314, a second optical fiber running from the cavity 314 through the passageway 318 to the window 56 and a fiber-to-fiber coupler connecting these optical fibers within the cavity 314. The light guide 326 may be clamped in position within the cavity 314 so as to keep its end pressing on the inside face 57 of the window 56. After the instrument unit 320 and the light guide have been fitted into place, the collar 312 is fitted around the section 308 and the projection 310.

FIG. 24 shows an arrangement which is functionally similar to that in FIG. 23, but has a different construction. The drill bit body is very similar to part of the drill bit shown in FIG. 4. It has a planar face at the uphole end of the gauge pads 43, and so the shank 49 and pin 32 are not present. The sub 350 is similar to the sub 300 but does not include the box 302. The drill bit is bolted to the sub 350 by a plurality of bolts into threaded holes in the drill bit body. One of the bolts is indicated at 352.

The sub 350 contains an instrument unit 320 as in FIG. 23 and after the drill bit has been bolted to the sub 350 a light guide 326 is fitted, extending from the chamber 322 within the instrument unit, through an opening 354 in the end face of the sub 350 into the passageway 318 in the drill bit and through this passageway to the inside face 57 of the window 56 in the cutter 59. In FIG. 23, part of the light guide 326 within the passageway 318 has been omitted so that the passageway 318 can be seen more clearly. Inside the sub 350, the light guide 326 is enclosed by a tube 356 having an internal diameter which may be between two and five times the diameter of the optical fiber 326 as described herein, and so the cross-sectional area within this tube 356 may be between four and twenty-five times the cross sectional area of the fiber 326.

The partial view in FIG. 25 shows a variation. The light source in the instrument unit 320 is a laser and the instrument unit has a light outlet for excitation light from the laser which is separate from the inlet for light returning from the formation. As in FIGS. 20 and 21 there are two passageways through the drill bit and the hard surfaced cutter to its window. FIG. 25 shows a light guide for excitation light which runs through a passageway 368 leading to the windowed cutter. There is a spacing between the unit 320 and the beginning of the optical fiber 366. Light from the laser light source in the unit 320 travels as a straight light beam along path 357, shown as a dotted line, before entering the optical fiber 366. The equipment shown in FIGS. 23 to 25 could be used for the various forms of spectroscopy mentioned herein, and in particular could be used for fluorescence spectroscopy.

Experimental Test

An experimental test was carried out demonstrating the observation of fluorescence. The experiment was carried out using a test device with a drill bit with a windowed cutter, generally as shown by FIG. 4, attached to a short drill pipe. An instrument pack containing optical parts as shown on FIG. 10 was mounted on the drill pipe and an optical fibre ran from this pack, along the outside of the drill pipe, into a junk slot of the drill bit and then entered the drill bit through the trailing surface of the blade with the windowed cutter. The optical fibre then extended along a passageway through the blade and the passageway 58 through the windowed cutter to the inside face 57 of the window 56 in the cutter. Where the optical fibre ran down the outside of the drill pipe and drill bit, it was enclosed in a protective tube. The CMOS sensors 90 of the microspectrometer 84 were connected to a data recorder. The drill bit was rotated by an electric motor turning the drill pipe and made to drill downwards into blocks of sandstone arranged in a column.

Figure 26:
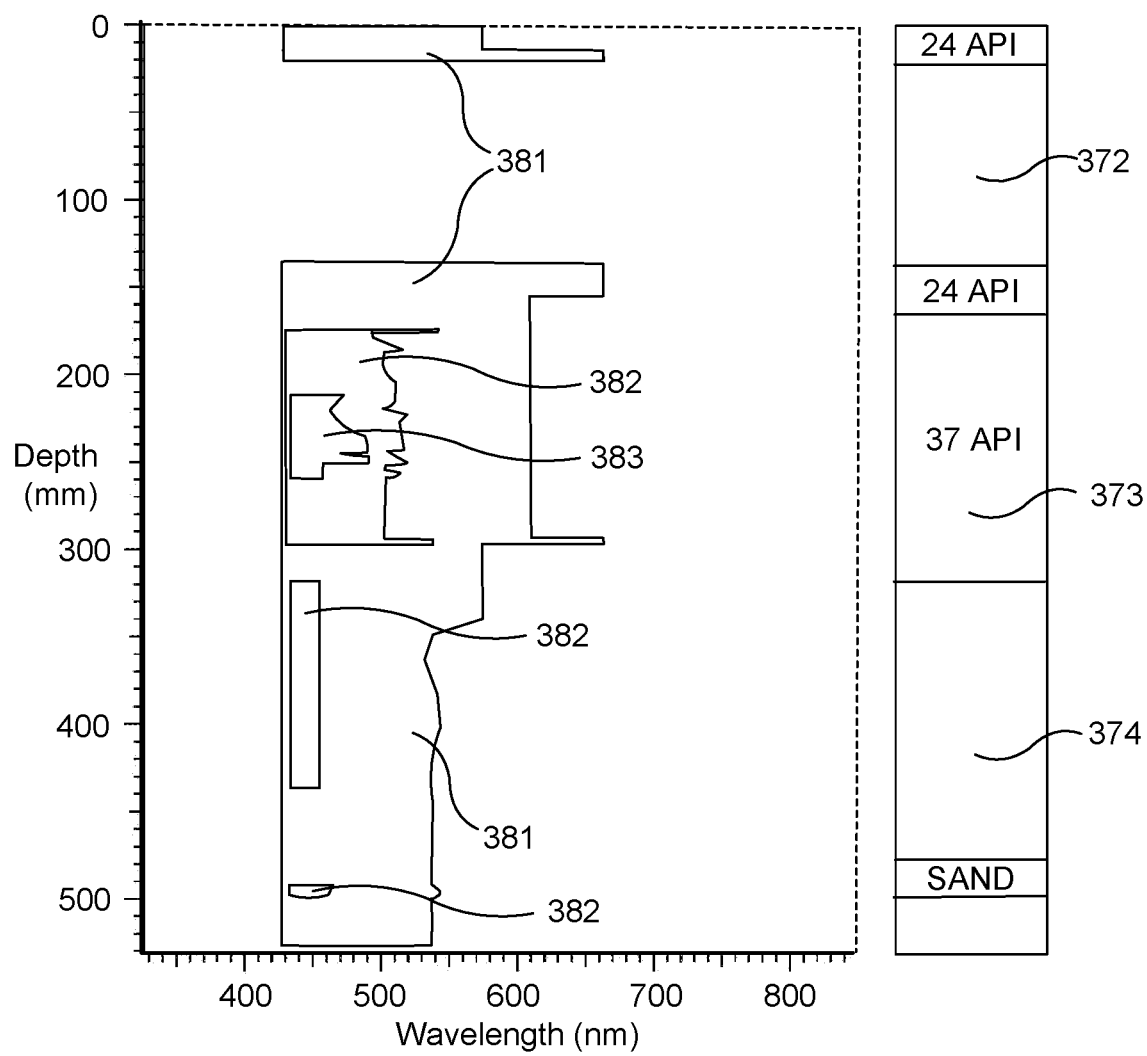
FIG. 26 shows material used in an experimental test, and the results from that test.

Some of the blocks of sandstone had been artificially impregnated with oil, as shown diagrammatically at the right of FIG. 26. The fluorescence recorded during drilling was presented as a graph with depth on the vertical axis and wavelength on the horizontal axis. The depth scale on the vertical axis of the graph at the left of FIG. 26 is aligned with the column of sandstone blocks depicted at the right. The intensity of the observed fluorescence was shown on the graph as color. Regions of the graph where some fluorescence was observed have been outlined and indicated as 381. Regions where the fluorescence was more intense have been indicated 382 and a region where the intensity was even greater is indicated as 383.

FIG. 26 shows that as the drill bit drilled through the block of sandstone 372 which had not been impregnated with oil, there was negligible fluorescence. By contrast, fluorescence from the 24 API gravity oil was observed as the drill bit passed through the sandstone blocks adjacent the block 372 and as the drill bit passed through the block 373 impregnated with 37 API oil. Fluorescence was observed as the drill bit passed through the block 374 which had not been deliberately impregnated with oil. This was attributed to contamination by oil draining from the block 373 above.

The description of embodiments above illustrates a range of possibilities for combinations of features. The various features may be combined in other ways wherever it is feasible to do so. For instance, instrumentation with the forms shown in FIG. 16 or 19 could be located within a sub 300 or 350. FIG. 23 shows that a light guide can extend out of a drill bit into another part of the BHA. It is possible that a light guide or light guides could extend even further through a BHA to reach optics and electronics housed in another tool such as an MWD tool.

It will also be understood that terms such as first, second, etc. may be used herein to describe various elements, but these elements should not be limited by these terms. These terms are used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. Thus A and/or B would include A alone, B alone, and A and B in combination. It will be further understood that the terms "includes," "including," "comprises", "comprising", "having", and similar terms, when used in this specification or in the claims, specify the presence of stated features, steps, operations, elements, and/or components, but do not preclude the presence or addition of one or more other features, steps, operations, elements, components, and/or groups thereof. Further, as used herein, the term "may" or "can" are used herein to describe features, steps, operations, elements, and/or components that are present in certain embodiments, but are optional for other embodiments.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. For instance, while a single windowed cutter may be used, two, three, or more (and potentially all) cutters may be windowed cutters. Further, the position of such a cutter may be at any including at a cone, nose, shoulder, or gauge location of the cutting profile of the drill bit. Moreover, the order in which the elements of methods described herein are illustrated and described may be re-arranged, and/or two or more elements may occur simultaneously. The embodiments were chosen and described in order to explain at least some of the principals of the disclosure and their practical applications, to thereby enable others skilled in the art to utilize the disclosed apparatus, systems, and methods, and various embodiments with various modifications as are suited to the particular use contemplated.

What is claimed is:

1. A drilling tool, comprising:
   a plurality of cutting or gauge protection elements, wherein at least one cutting or gauge protection element of the plurality of cutting or gauge protection elements includes a window that is transparent to electromagnetic radiation, and which has an interior surface and a superhard exterior surface;
   a drilling tool body defining a plurality of pockets which accommodate the plurality of cutting or gauge protection elements and position the plurality of cutting or gauge protection elements to be in direct contact with a subterranean formation as the drilling tool body is rotated, and position the superhard exterior surface to be in direct contact with the formation or formation cuttings as the drilling tool body is rotated and urged axially forward;
   a source of electromagnetic radiation with wavelength in the range from 100 nm to 2600 nm configured to transmit electromagnetic radiation through the window toward the formation; and
   a receiver within the drilling tool configured to receive and analyze electromagnetic radiation returning through the window, wherein the source and the receiver are both accommodated within the drilling tool and spaced from the at least one cutting or gauge protection element having the window;
   wherein the receiver includes a spectrometer which separates returning radiation into a spectrum directed towards a plurality of light sensors.

2. The drilling tool of claim 1, wherein at least one of the source or the receiver is optically coupled to the window by at least one light guide forming at least part of an optical path running through the drilling tool body and to the interior surface of the window.

3. The drilling tool of claim 2, wherein the at least one light guide comprises a first light guide and a second light guide, wherein the first light guide forms a first optical path through the drilling tool body that carries electromagnetic radiation supplied by the source to the window, and wherein the second light guide forms a second optical path through the drilling tool body that carries returning electromagnetic radiation from the window for supply to the receiver, wherein the first optical path is separate and distinct from the second optical path.

4. The drilling tool of claim 3, wherein the first light guide comprises optical fiber or a light pipe, and the second light guide comprises different optical fiber or a different light pipe.

5. The drilling tool of claim 1, wherein at least one of the source or the receiver is positioned in a cavity in a portion of the drilling tool body which is axially above a cutting face of the drilling tool body, and which extends radially outwards to less than a full gauge of the drilling tool.

6. The drilling tool of claim 1, wherein the drilling tool is a drill bit or underreamer and the drilling tool body includes a plurality of blades projecting from the drilling tool body to a full gauge of the drill bit or underreamer, followed axially by a portion that extends radially outwards to less than the full gauge, and at least one of the source or the receiver being positioned within one or more cavities within the such portion.

7. The drilling tool of claim 1, wherein the drilling tool body comprises a drill bit body with a plurality of blades projecting from the drill bit body, and the at least one cutting or gauge protection element having the window is positioned in a pocket in one of the plurality of blades.

8. The drilling tool of claim 1, wherein the receiver is optically coupled to the window by at least one light guide forming a complete optical path through the drilling tool from the interior surface of the window to the receiver.

9. The drilling tool of claim 8, further comprising an internal passageway leading to the element with the window from a cavity containing at least one of the source or receiver, wherein the internal passageway comprises a continuous length running for at least 75% of a path length from the cavity to the window, wherein the at least one light guide is loose fit within the said length of the internal passageway with any width across the internal passageway being no more than five times any width across the at least one light guide, and wherein the internal passageway is configured so that the at least one light guide in the continuous length does not bend with a radius of curvature less than ten times any width of the at least one light guide.

10. The drilling tool of claim 8, wherein the at least one light guide includes materials that do not emit fluorescence within the at least one light guide.

11. The drilling tool of claim 8, wherein the source is arranged to transmit radiation within a first range of wavelengths shorter than a boundary value, and the receiver is configured to detect fluorescence within a second range of wavelengths longer than the boundary value.

12. The drilling tool of claim 11, wherein the at least one light guide includes an optical fiber having a light transmitting core and a sheath, the sheath formed of material which does not emit fluorescence in the second range of wavelengths.

13. The drilling tool of claim 12, wherein the sheath comprises a polyimide material or a metallic material.

14. The drilling tool of claim 11, wherein the receiver is arranged to determine a magnitude of returning radiation at each of a plurality of wavelengths in the second range of wavelengths.

15. The drilling tool of claim 14, wherein the receiver comprises wavelength filters for filtering the returning radiation.

16. The drilling tool of claim 1, wherein the spectrometer is a microspectrometer that is arranged so that the returning radiation falls on a diffraction grating at a curved mirror, and the plurality of light sensors are formed or positioned on a semiconductor chip.

17. The drilling tool of claim 1, wherein the spectrometer is a hermetically sealed component including a window for entry of electromagnetic radiation and pins arranged and designed to connect to a circuit board.

18. The drilling tool of claim 1, wherein at least one of the source or the receiver includes one or more electronic components, and at least one of the source or the receiver being thermally connected to a flow path for fluid for cooling of the one or more electronic components.

19. The drilling tool of claim 18, further comprising an active cooling mechanism arranged to transfer heat from the one or more electronic components to a drilling fluid flow path.

20. The drilling tool of claim 19, wherein the active cooling mechanism comprises at least one Peltier cooler configured to transfer heat from the one or more electronic components to thermally conductive material in contact with the drilling fluid flow path.

21. The drilling tool of claim 1, wherein the source includes a pulsed laser arranged to vaporize material of the formation in contact with the window to create a plasma, and the spectrometer is arranged to analyze electromagnetic radiation emitted from the plasma.

* * * * *